United States Patent
Mathers

[15] 3,669,234
[45] June 13, 1972

[54] FLUID CONTROLS FOR ENGINE AND FORWARD-REVERSE TRANSMISSION

[72] Inventor: Harold M. Mathers, Seattle, Wash.
[73] Assignee: Mathers Controls, Inc., Seattle, Wash.
[22] Filed: Feb. 24, 1970
[21] Appl. No.: 13,496

Related U.S. Application Data

[63] Continuation-in-part of Ser. No. 730,017, May 17, 1968, Pat. No. 3,543,891.

[52] U.S. Cl. ............................192/.098, 192/.094, 192/4 C, 192/109 F, 74/858, 74/874, 192/4 B
[51] Int. Cl. .....................................B60k 29/00, B60k 21/00
[58] Field of Search....................74/858, 872, 873, 874, 846; 192/4 C, 3.57, .094, .098

[56] References Cited

UNITED STATES PATENTS

| | | | |
|---|---|---|---|
| 2,961,078 | 11/1960 | Shannon et al. | 192/4 C |
| 3,386,523 | 6/1968 | Ruhl | 192/4 C X |
| 2,925,156 | 2/1960 | Grant et al. | 192/.084 X |
| 2,386,392 | 10/1945 | Fikeet et al. | 74/858 X |
| 2,438,683 | 3/1948 | Rohrer et al. | 192/.094 |
| 2,524,487 | 10/1950 | Stevens | 74/874 |
| 3,007,347 | 11/1961 | Gendron et al. | 192/.098 X |

*Primary Examiner*—Benjamin W. Wyche
*Attorney*—Seed, Berry and Dowrey

[57] ABSTRACT

This invention relates to control mechanism for propulsion systems wherein single lever control of clutch and engine governor is provided. More specifically, this invention relates to such control mechanism wherein the sequence of application of clutch, engine governor and shaft brake actuation signals is controlled in an automatic, predetermined manner to reduce engine, clutch and gear train wear.

A propulsion control system is also provided with a master control which is connected with a replaceable air drive unit either mechanically or pneumatically. The air drive unit is premanufactured to desired specifications for performing operational functions, including automatic neutral delays between forward and reverse directional modes and speed interrupt delays, so that malfunction of one component of the air drive unit may be corrected by replacing the entire unit.

12 Claims, 11 Drawing Figures

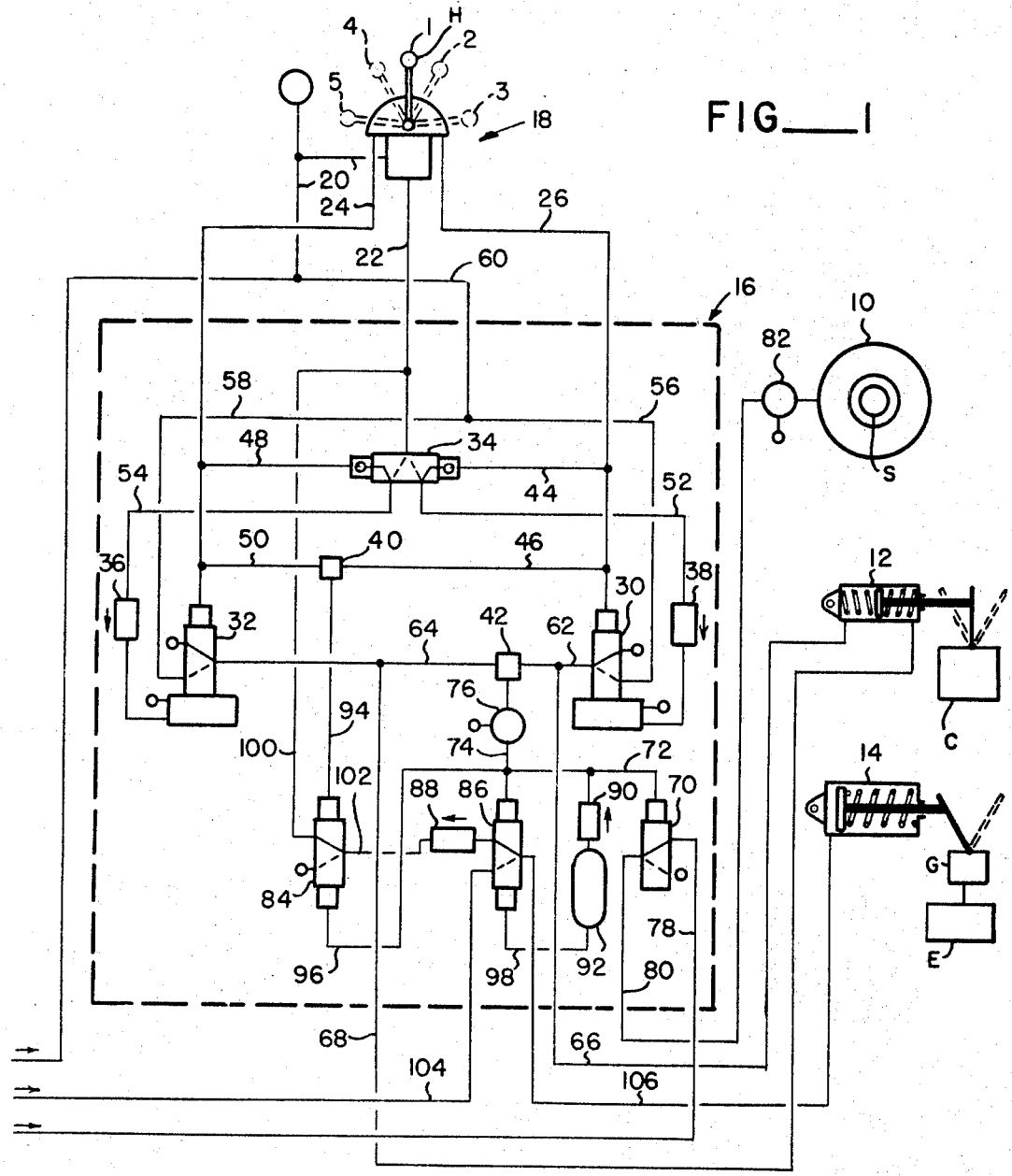
FIG__1

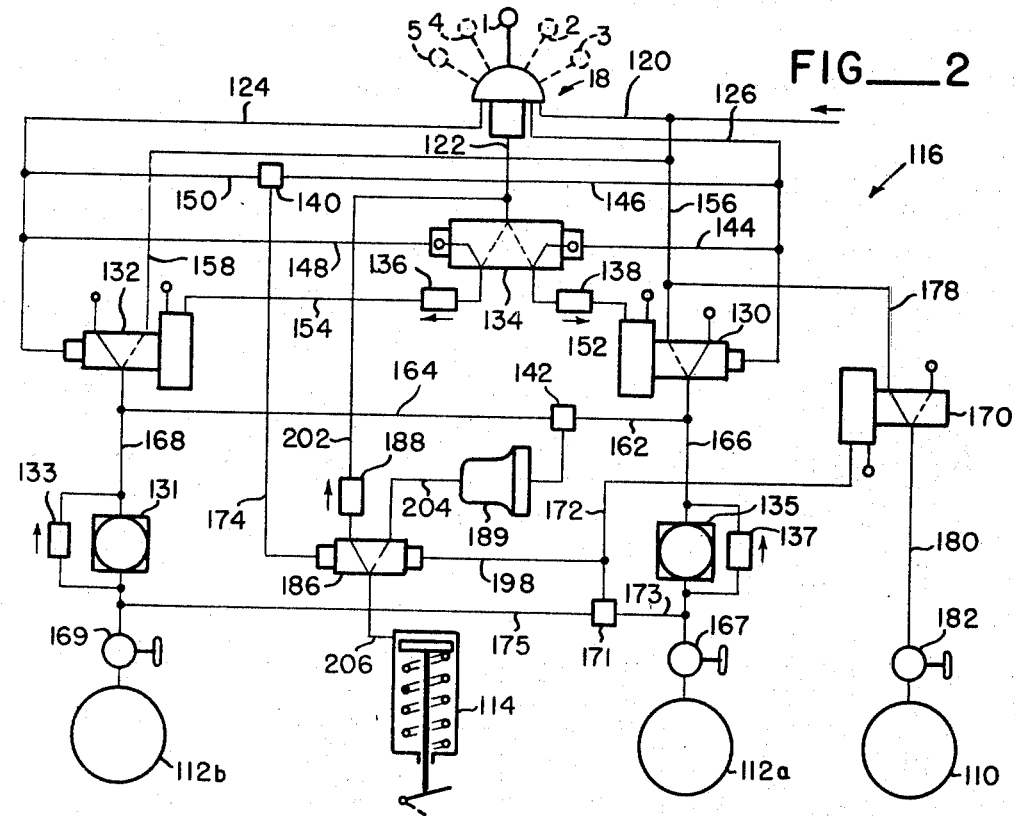
FIG__2
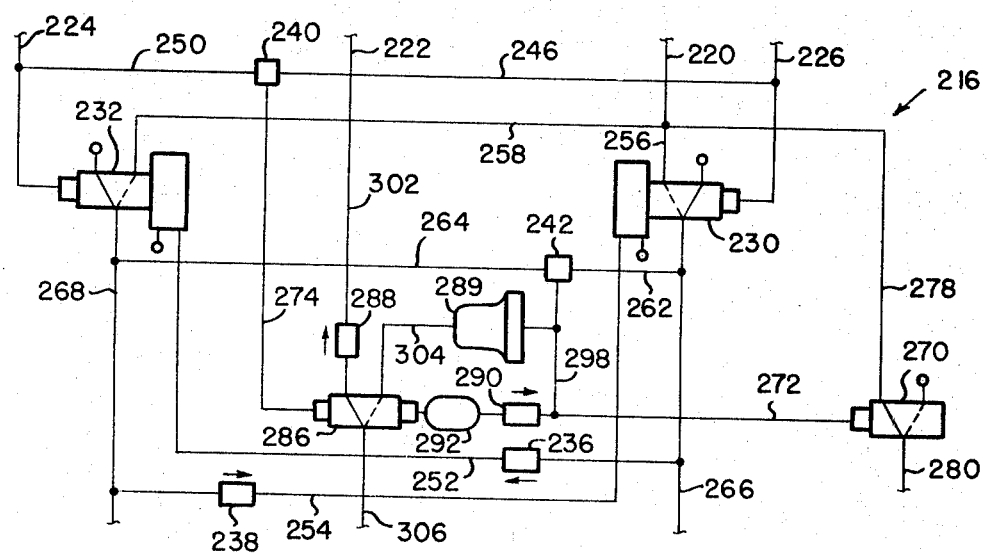
FIG__3

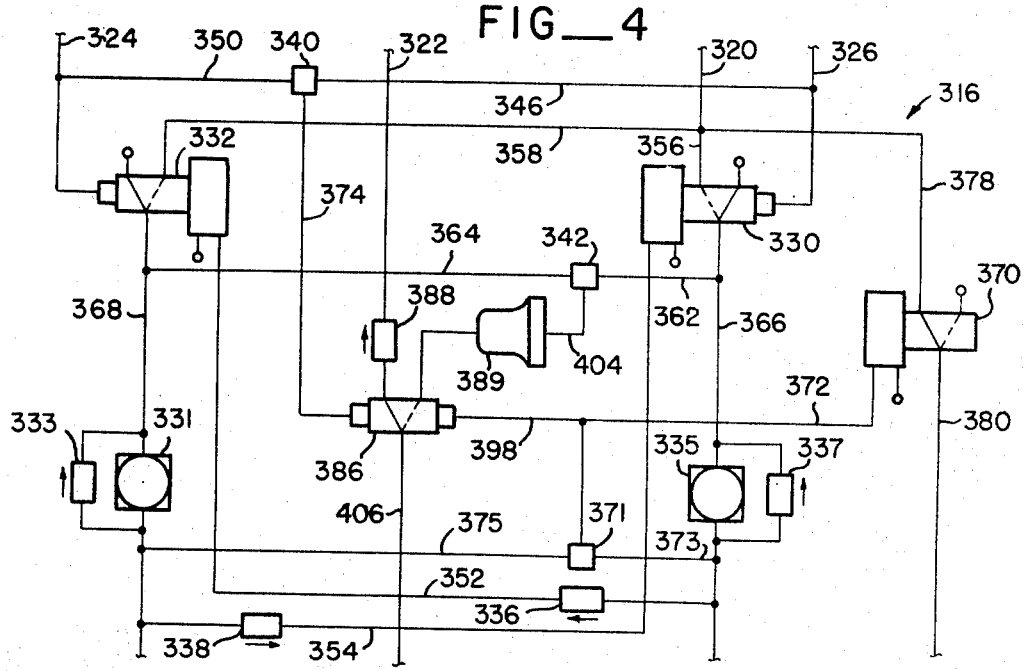
FIG_4
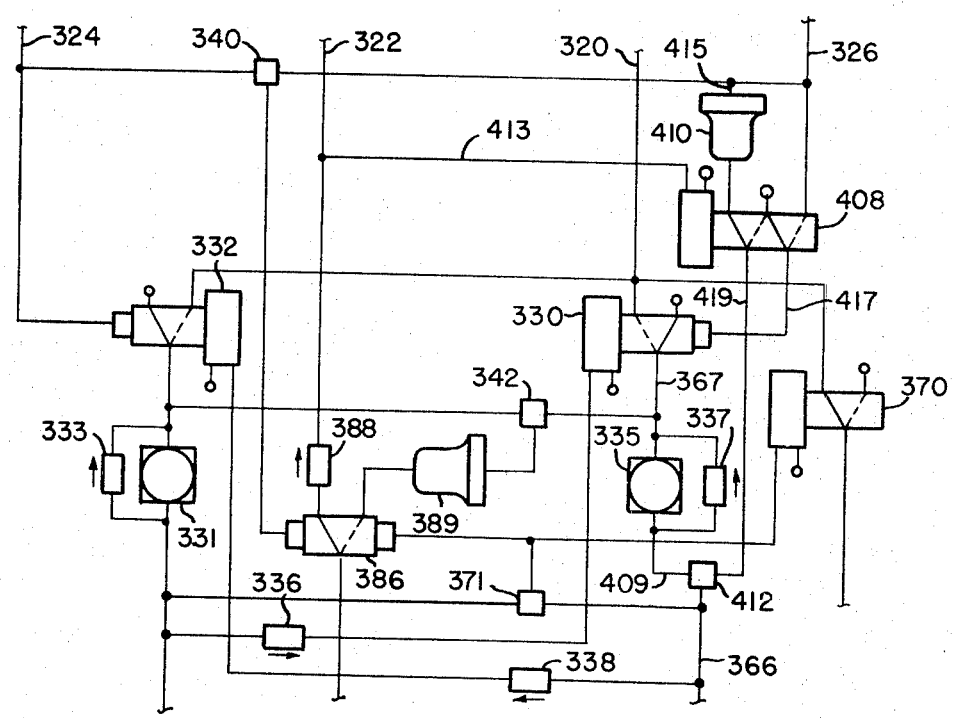
FIG_5

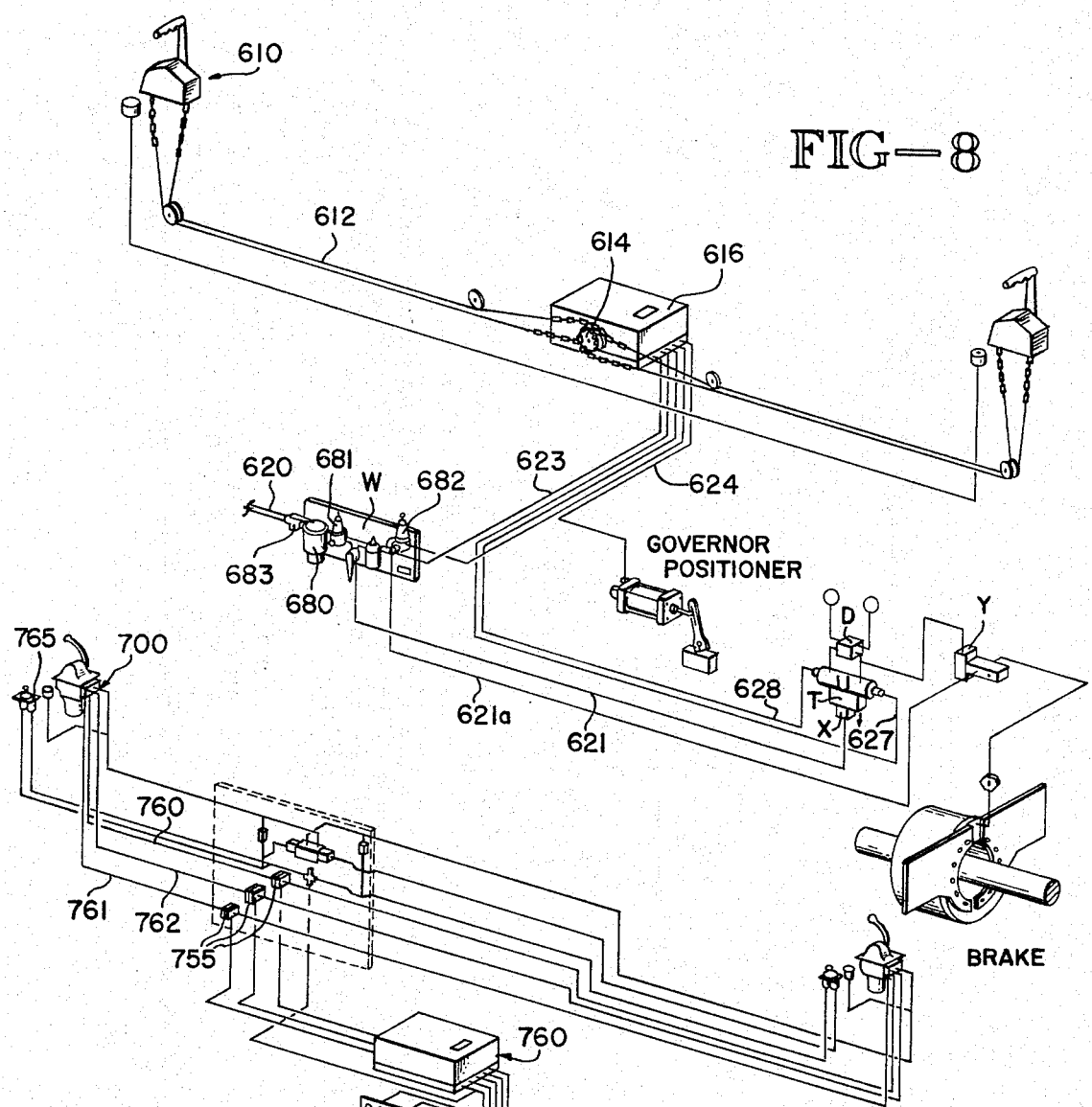
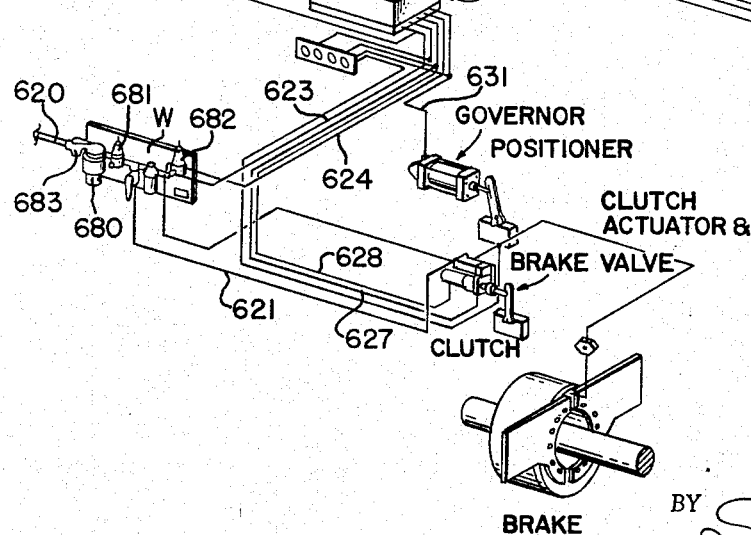

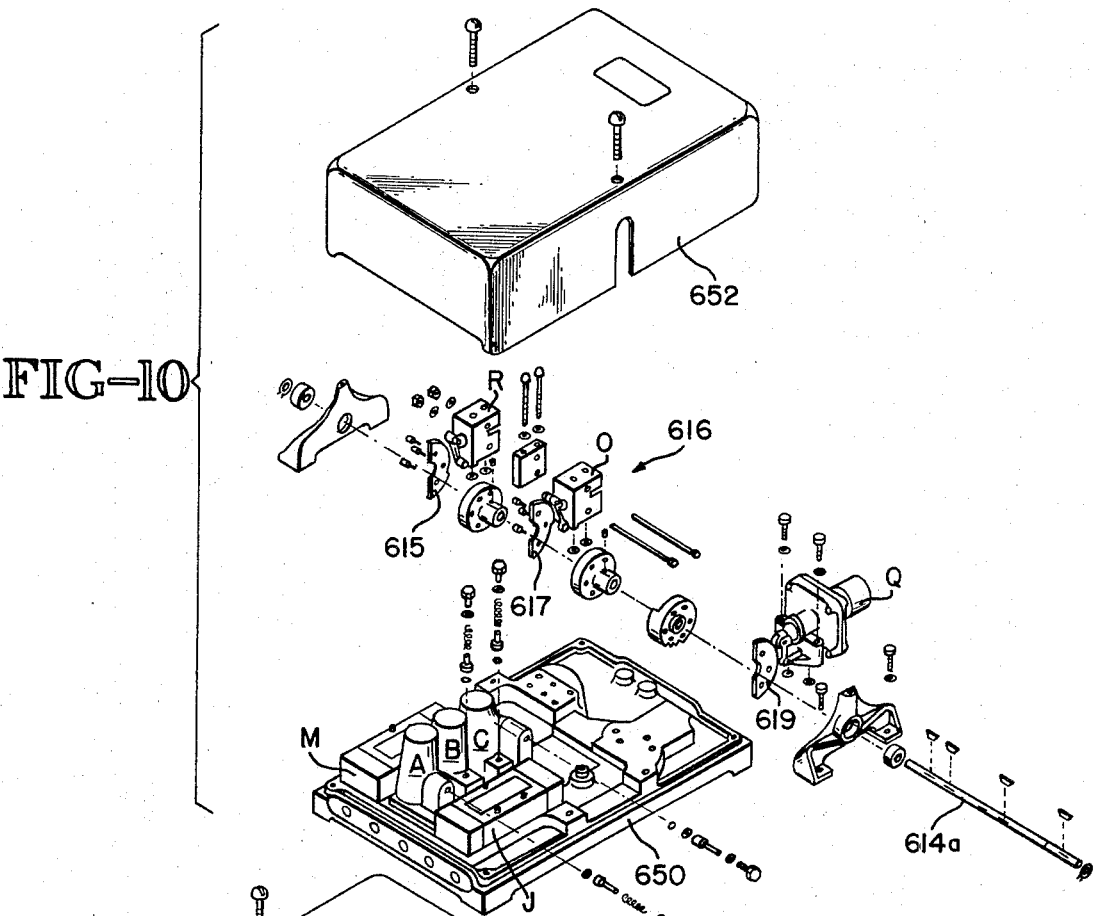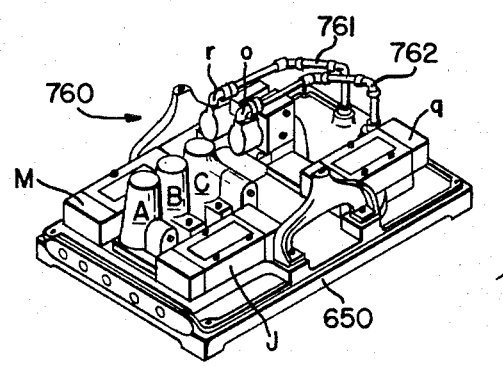

FLUID CONTROLS FOR ENGINE AND FORWARD-REVERSE TRANSMISSION

CROSS REFERENCE TO RELATED APPLICATIONS

This is a continuation-in-part of Mather's application Ser. No. 730,017, filed May 17, 1968, now U.S. Pat. No. 3,543,891, and entitled PROPULSION SYSTEM ENGINE CONTROL MECHANISM.

BACKGROUND OF THE INVENTION

1. Field of the Invention

Means to control propulsion systems and, more particularly to propulsion control systems especially adaptable to marine application or the like.

2. Description of the Prior Art

In many propulsion system installations, particularly those in the marine field, the system is called upon to reverse itself either from a full ahead condition to a full reverse condition or vice versa, in a minimum amount of time. In the usual installation, the clutch and reduction gears take the brunt of the forces created by such "crash reversal" conditions. Considering that engines are being provided in the marine field in the horsepower range of 600 to 3,200 Hp to swing seven to 11 foot propellers at gear reductions of from 4:1 to 6:1, it is not surprising that severe wear conditions are imposed on the clutch and reduction gears. Shaft brakes have been provided in an attempt to minimize these wear conditions but brake control has not been synchronized with clutch and throttle control such that the clutch and reduction gear loading is materially reduced.

Propulsion control systems particularly those involving marine propulsion application, have heretofore either been of simple circuit configurations or, where complex circuits have been employed, highly skilled technicians have been required to make repairs. When the propulsion control system was at a remote location, such as aboard a vessel in the middle of an ocean, it was necessary to take expensive and time consuming corrective procedures to repair a malfunctioning system, oftentimes requiring transporting of skilled personnel and equipment to the vessel.

SUMMARY OF THE INVENTION

A primary object of this invention is to provide control mechanism for a propulsion system wherein the application of a "direction reversal" control signal to the mechanism results in simultaneous clutch disengagement to a neutral mode for a selected period of time, called a "neutral delay" period, application of the shaft brake during the neutral delay period to halt rotation of the engine output shaft, and reduction of engine speed to an "idle" condition, and simultaneous clutch reengagement to the opposite directional mode and disengagement of the shaft brake at the end of the neutral delay period, and re-establishment of the desired engine speed. Another object is to provide such control mechanism wherein a speed boost is automatically applied to the engine upon reengagement of the clutch following the neutral delay period to prevent the engine from stalling upon re-connection with the load. A further object is to provide such a mechanism wherein single lever control can be employed to provide the aforementioned control signal.

It is a primary object to provide a control system which is highly effective to carry out directional and speed functions, including automatic neutral delays, with a high degree of accuracy and which may be repaired quickly without skilled mechanics should a malfunction occur. Basically the invention includes a master control mechanism which is operatively connected to a readily replaceable fluid control unit which houses various valve mechanisms and delay mechanism which in response to signals from the master control carry out the various functions desired. The fluid control unit is premanufactured to perform desired functional operations and is sealed in a housing to prevent tampering or to become inoperative because of debris or corrosion.

Another object of the system is to provide a replaceable control unit which is operable to perform the functions of neutral delay between forward to reverse and reverse to forward directional control signals and to provide a speed interrupt during said neutral period.

BRIEF DESCRIPTION OF THE DRAWINGS

FIG. 1 depicts a pneumatic control mechanism circuit for controlling a pneumatic shaft brake, a hydraulic clutch, and a governor wherein the neutral delay period is variable and proportioned to engine speed;

FIG. 2 depicts a pneumatic control mechanism circuit for controlling pneumatic shaft brake, clutches, and a governor, wherein the neutral delay period is variable and proportioned to engine speed;

FIG. 3 depicts a pneumatic control mechanism circuit for controlling a pneumatic shaft brake, a hydraulic clutch, and a governor wherein the neutral delay period is fixed and proportioned to engine speed;

FIG. 4 depicts a pneumatic control mechanism circuit for controlling pneumatic shaft brake, clutches, and a governor wherein the neutral delay period is fixed and proportioned to engine speed; and FIG. 5 depicts the FIG. 4 circuit with provision made for controlling a slip clutch;

FIG. 8 is a perspective illustration showing schematically the control system of FIG. 6 and the functional elements controlled;

FIG. 9 is likewise a perspective illustration showing schematically the control system of FIG. 7 and the functional elements controlled;

FIG. 10 is an exploded perspective of the replaceable fluid control unit illustrated in FIG. 6; and FIG. 11 is an exploded perspective of the replaceable fluid control unit shown in FIG. 7;

DESCRIPTION OF THE PREFERRED EMBODIMENTS

Figure 6:
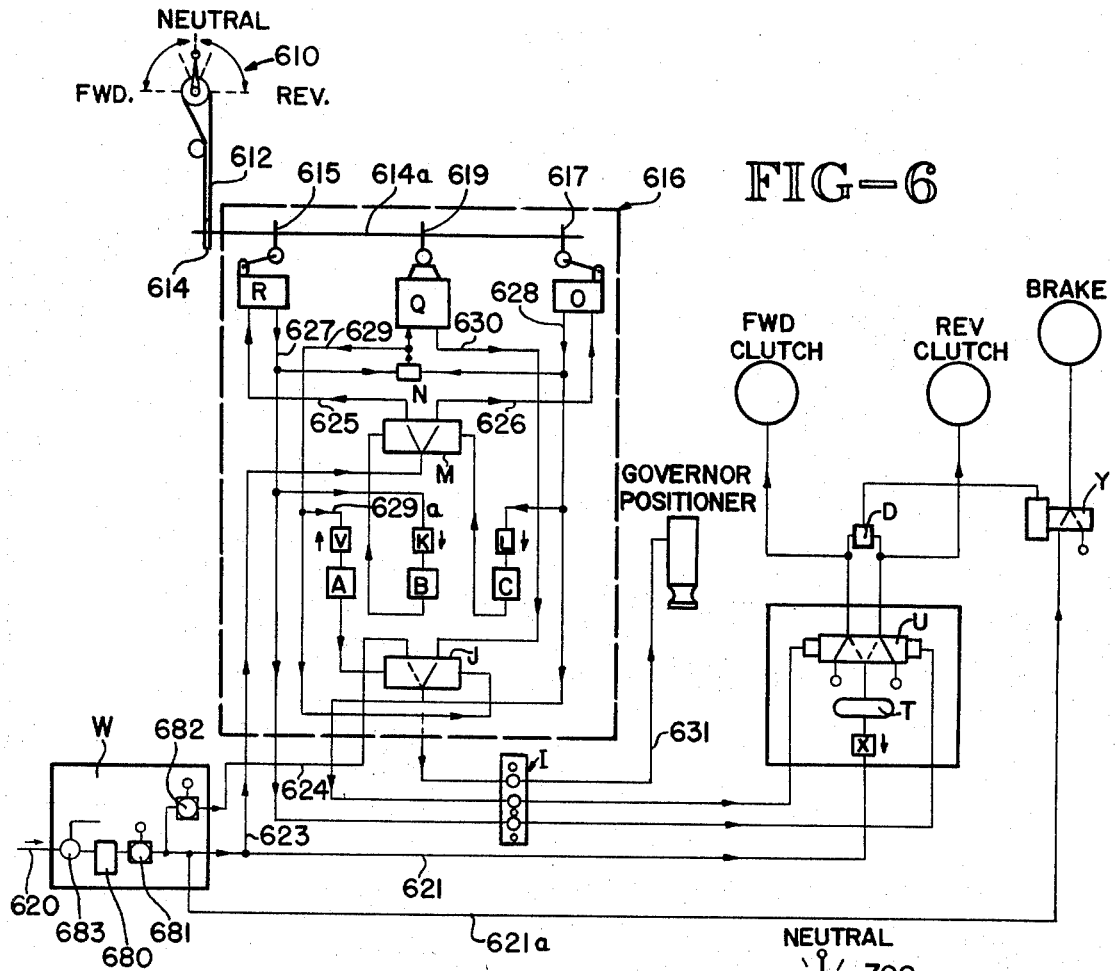
FIG. 6 is a diagrammatic propulsion control system embodying principles of the invention and including a mechanical connection between a master control and a replaceable fluid control unit.

In brief, the present invention comprises control mechanism to selectively control power output, clutch engagement and brake application in a propulsion system including a power source and a governor operable to control the power source output, an output shaft connectable to a load, clutch means engageable in forward and reverse modes of operation and adapted to connect the output shaft to the power source to drive the output shaft in forward or reverse directions, and shaft brake means operable to brake the output shaft. The control mechanism comprises signal means, clutch control means, brake control means, and throttle control means. The signal means is adapted to provide forward or reverse directional control signals and to provide a power source output control signal. The clutch control means is operable to cause the clutch means to be engaged in forward or reverse modes responsive to directional signals received from the signal means. The clutch control means also is operable to cause the clutch means to be disengaged from a directional mode to a neutral mode for a neutral delay period of selected duration responsive to a reversal in direction signals transmitted from the signal means before being re-engaged to the opposite directional mode. The shaft brake control means is operable to cause the shaft brake means to engage and brake the output shaft during the neutral delay period resulting from the reversal in directional signals transmitted from the signal means. The throttle control means is operable to cause the governor to control the power source output in a preselected manner independently of the power source output signals transmitted from the signal means during a neutral delay period and then to re-establish the responsiveness of governor control to power source output signal transmitted from the signal means following the end of a neutral delay period.

The provision of a neutral delay period in response to a direction reversal command permits the shaft brake means to halt the output shaft while the clutch means is in its neutral mode and before the clutch means is caused to reengage to connect the output shaft to the power source for rotation in the opposite direction. The duration of the neutral delay period may be variable depending on the output shaft speed at the onset of the neutral delay period such that the time required for the brake means to be applied and halt the output shaft will be that afforded by the neutral delay period. Alternately, the duration of the neutral delay period may be proportioned to the highest output shaft speed expectable at the onset of the neutral delay period such that the braking time required by the brake means to halt the output shaft will be exceeded at lower speeds and only matched at the highest expected speed.

The provision of a neutral delay period in response to a direction reversal command also permits a reduction in the output of the power source such that when the clutch means is re-engaged at the end of the neutral delay period the output can be increased to the level commanded without undue strain on the components of the propulsion system.

In the preferred embodiments of the control mechanism of this invention as depicted in the Figures, their respective components are pneumatic components designed to operate on a pressurized air supply as might be provided on a marine vessel to operate various other equipment. In marine applications, output shaft brakes and engine governors are usually air actuated. Also in marine applications, the clutches may be either of the hydraulic type wherein "ahead" and "astern" modes of operation are obtained by appropriate positioning of the swashplate on a hydraulic pump, or of the pneumatic type wherein separate "ahead" and "astern" clutch assemblies are provided and "ahead" and "astern" modes of operation are obtained by selectively engaging the appropriate clutch assembly to the output shaft. Accordingly, the preferred embodiments of the control mechanism of this invention as depicted in the Figures are designed for use with an air brake assembly, an air-actuated governor assembly, and with either an hydraulic clutch assembly or an air clutch assembly. Of course, equivalents of the brake and clutch assemblies and of the pneumatic circuitry itself is contemplated to be within the scope of the invention.

In FIG. 1, an air brake assembly including an air-operated boot-type brake 10 that encloses a section of an output drive shaft S, an hydraulic clutch assembly C including an air-operated double acting and spring centered hydraulic pump swashplate actuator 12, a power source or engine E, and an engine governor assembly G including an air-operated spring returned governor positioner 14 are selectively operated by a control mechanism in response to command signals transmitted from a master control 18 of the control mechanism.

The master signal means or control 18 is a single lever control valve having lever H, a supply air input 20, and a power source output control signal or "speed" output 22, a reverse signal or an "astern" output 24 and a forward signal or "ahead" output 26. The valve is designed such that the input port is blocked and all output ports are vented when the control lever is in the "neutral" position 1 shown in solid line. With the control lever in the "ahead" detent position 2 shown in dashed lines, the "ahead" output port supplies full line pressure, the "astern" port is vented and the "speed" output port supplies an initial pressure—typically 5 psi—that varies up to some maximum pressure—typically 65 psi—in proportion to the degree of lever advancement as the control lever is advanced to the "full speed ahead" detent position 3 shown in dashed lines. With the control lever in the "astern" detent position 4 shown in dashed lines, the "astern" port supplies full line pressure, the "ahead" port is vented, and the "speed" output port supplies an initial pressure—typically 5 psi—that varies up to some maximum pressure—typically 65 psi—in proportion to the degree of lever advancement as the control lever is advanced to the full speed astern detent position 5 shown in dashed lines.

The clutch control means of the control mechanism comprises an "ahead" clutch control valve 30, a "reverse" clutch control valve 32, a clutch reversing valve 34, a forward-to-reverse neutral delay timing valve 36, a reverse-to-forward neutral delay timing valve 38, a directional shuttle valve 40, and a speed shuttle valve 42. Clutch control valves 30 and 32 each comprise a double pilot-operated and spring returned three-way spool valve with a high pressure pilot operator at one end and a low pressure pilot operator at the other end. Clutch reversing valve 34 comprises a double pilot-operated and spring centered four-way spool valve with an exhaust center. Timing valves 36 and 38 each comprise a flow control valve with free flow in the direction of the arrow and with flow restricted in the opposite direction by an adjustable needle valve. Shuttle valves 40 and 42 each comprise an isolation-type valve having two input ports and one output port wherein the two inputs are isolated with the lower pressure input port blocked and the higher pressure input port opened to the output port.

The "ahead" output port of the master control 18 is in fluid communication with the high pressure operator of control valve 30 through line 26, the right hand operator of reversing valve 34 through lines 26 and 44, and the right hand input port of shuttle valve 40 through lines 26 and 46. The "astern" output port of the master control 18 is in fluid communication with the high pressure operator control valve 32 through line 24, the left hand operator of reversing valve 34 through lines 24 and 48, and the left hand input port of shuttle valve 40 through lines 24 and 50. The "speed" output port of the master control 18 is in fluid communication with the input port to reversing valve 34 through line 22. The right hand output port of reversing valve 34 is in fluid communication with the low pressure operator of control valve 30 through line 52 and timing valve 38, and the left hand output port of reversing valve 34 is in fluid communication with the low pressure operator of control valve 32 through line 54 and timing valve 36. The input port of each control valve, 30 and 32, is in fluid communication with the control air supply through lines 56–60 and lines 58–60, respectively. The output port of control valve 30 is in fluid communication with the right hand inlet port of shuttle valve 42 through line 62, and with the "ahead" port of clutch actuator 12 through line 66. The output port of control valve 32 is in fluid communication with the left hand inlet port of shuttle valve 42 through line 64, and with the "astern" port of clutch actuator 12 through line 68.

The brake control means comprises a single pilot operated and spring returned three-way spool valve 70. The operator of valve 70 is in fluid communication with the output port of shuttle valve 42 through lines 72 and 74 and quick release valve 76. The input port of valve 70 is in fluid communication with brake air supply through line 78, and the output port of valve 70 is in fluid communication with the brake air boot 10 through line 80 and quick release valve 82.

The throttle control means comprises a speed control valve 84, a speed boost control valve 86, a speed timing valve 88, a speed boost timing valve 90 and a reservoir 92. Control valves 84 and 86 each comprise a double pilot-operated and spring returned three-way spool valve. Timing valves 88 and 90 each comprise a flow control valve with free flow in the direction of the arrow and with flow restricted in the opposite direction by an adjustable needle valve. The top and bottom operators of valve 84 are in fluid communication with the output ports of shuttle valves 40 and 42, respectively, through lines 94 and 74–96, respectively. The top operator of valve 86 is in fluid communication with the output port of shuttle valve 42 through line 74 and the bottom operator of valve 86 is in fluid communication with the output port of shuttle valve 42 through line 74 and the bottom operator of valve 86 is in fluid communication with the output port of shuttle valve 42 through line 98, reservoir 92, flow control valve 90 and lines 72 and 74. The inlet port of valve 84 is in fluid communication with the "speed" outlet port of master control 18 through lines 100 and 22, and the outlet port of valve 84 is in fluid communication with the top inlet port of valve 86 through line 102 and flow control valve 88. The bottom inlet port of valve 86 is in fluid communication with a speed boost air supply through line 104, and the outlet port of valve 86 is in fluid communication with the port of the governor positioner 14 through line 106.

When the control lever of the master control 18 is in its neutral detent position as shown, the respective spools of the control valves are spring positioned to provide the internal porting depicted by the solid lines, all pilot operators being vented. Thus the inlet port of reversing valve 34 is blocked and its two outlet ports are vented. The inlet port of each control valve 30 and 32 is blocked and its outlet is vented. The inlet port and outlet port of each valve 84 and 86 is interconnected. The top inlet port of valve 86 is interconnected to its outlet port. The "ahead," "astern" and "speed" outlet ports of the master control 18 are vented. Thus, the clutch actuator 12 is self-positioned in neutral with its "ahead" and "astern" air lines 66 and 68 exhausted through valves 30 and 32, respectively, the governor positioner 14 is self-positioned at "idle" and its air line 106 exhausted through the master control "speed" outlet port, and the brake is applied with the brake air boot 10 filled with brake supply air through line 78, valve 70 and line 80. Control air supply is blocked at the inlet port of the master control valve and at the inlet ports of control valves 30 and 32.

When the control lever of the master control 18 is shifted from neutral to the "ahead" detent position 2, full control air supply pressure is applied through the "ahead" outlet port of the master control to the right hand operator of reversing valve 34, to the high pressure operator of the "ahead" clutch control valve 30, and through shuttle valve 40 to the top operator of the speed control valve 84. Pressure on the right hand operator of valve 34 causes its spool to shift leftward thereby venting its right outlet port and interconnecting its left outlet port to its inlet port. Pressure on the high pressure operator of the valve 30, with its low pressure operator being vented at valve 34, causes the spool of valve 30 to shift to interconnect its inlet port to its outlet port. Full control air supply pressure therefore is transmitted: (a) through clutch control valve 30, shuttle valve 42 and quick release valve 76, in that order, to the top operators of valves 70 and 86 and to the bottom operator of valve 84; (b) through the "ahead" outlet port of the master control 18 and shuttle valve 40 to the top operator of valve 84; (c) through valve 30, to the "ahead" port of the clutch actuator 12; substantially simultaneously. Thus, the clutch actuator 12 causes the clutch to engage in its forward mode, the spool of valve 70 shifts to exhaust its outlet port and thereby permit quick release valve 82 to vent the brake air boot 10 to release the brake, the spool of valve 84 remains stationary because of the balanced pressures on its operators the spool valve 86 shifts to block its upper inlet port and connect its lower inlet port to its outlet port thereby transmitting speed boost supply pressure to the governor positioner 14 to give the engine throttle a speed boost to prevent engine stall as the engine is clutched on the line.

Full control air supply pressure is also transmitted through valves 30, 42 and 76 to timing valve 90. Control air supply pressure bleeds through valve 90 at a rate dependent on needle valve adjustment therein to reservoir 92 and thence to the bottom operator of valve 86. When the pressure on the bottom operator of valve 86 reaches full control air supply pressure, the pressure on both operators of valve 86 will balance, causing its spool to be spring returned to block its lower inlet port and to interconnect its upper inlet port to its outlet port thereby terminating the throttle speed boost and permitting transmission of the initial seed pressure, eg 5 psi, from the "speed" outlet port of the master control 18 through valves 84, 88 and 86 to the governor positioner 14. The initial speed pressure is also transmitted from the "speed" outlet port of the master control 18 through valves 34 and 36 to the low pressure operator of valve 32, thereby maintaining the spool of valve 32 stationary so that its outlet port remains vented, the high pressure operator of valve 32 being vented at the "astern" port of the master control 18.

Shifting the control lever of the master control from detent position 2 to "full speed" detent position 3 merely increases the speed pressure on the governor positioner 14. A sudden increase in speed pressure will be timed out by the adjustable needle valve restriction in flow control valve 88.

When the control lever of the master control 18 is shifted from the neutral detent position to the "astern" detent position 4, full control air supply is applied through the "astern" outlet of the master control to the left hand operator of the reversing valve 34, to the high pressure operator of the "astern" clutch control valve 32, and through shuttle valve 40 to the top operator of the speed control valve 84. Pressure on the left hand operator of valve 34 causes its spool to shift rightward thereby venting its left outlet port and interconnecting its right outlet port to its inlet port. Pressure on the high pressure operator of valve 32, with its low pressure operator being vented at valve 34, causes the spool of valve 32 to shift to interconnect its inlet port to its outlet port. Full control air supply pressure therefore is transmitted: (a) through clutch control valve 32, shuttle valve 42 and quick release valve 76, in that order, to the top operators of valves 70 and 86 and to the bottom operator of valve 84; (b) through the "astern" outlet port of the master control 18 and shuttle valve 40 to the top operator of valve 84; and (c) through valve 32 to the "astern" port of the clutch actuator 12, substantially simultaneously. Thus, the clutch actuator 12 causes the clutch to engage in its reverse mode, the spool of valve 70 shifts to exhaust its outlet port and thereby permit quick release valve 82 to vent the brake air boot 10 and to release the brake, the spool of valve 84 remains stationary because of the balanced pressures on its operators, the spool of valve 86 shifts to block its upper inlet port and connect its lower inlet port to its outlet port thereby transmitting speed boost supply pressure to the governor positioner 14 to give the engine throttle a speed boost to prevent engine stall as the engine is clutched on line.

Full control air supply pressure is also transmitted through valves 32, 42 and 76 to timing valve 90. Control air supply pressure bleeds through valve 90 at a rate dependent on needle valve adjustment therein to reservoir 92 and thence to the bottom operator of valve 86. When the pressure on the bottom operator of valve 86 reaches full control air supply pressure, the pressure on both operators of valve 86 will balance, causing its spool to be spring returned to block its lower inlet port and to interconnect its upper inlet port to its outlet port thereby terminating the throttle speed boost and permitting transmission of the initial speed pressure, eg 5 psi, from the "speed" outlet port of the master control 18 through valves 84, 88 and 86 to the governor positioner 14. The initial speed pressure is also transmitted from the "speed" outlet port of the master control 18 through valves 34 and 38 to the low pressure operator of valve 30, thereby maintaining the spool of valve 30 stationary so that its outlet port remains vented, the high pressure operator of valve 30 being vented at the "ahead" port of the master control 18.

Shifting the control lever of the master control from detent position 4 to the "full speed" detent position 5 merely increases the speed pressure on the governor positioner 14. A sudden increase in speed pressure will be timed out by the adjustable needle valve restriction in flow control valve 88.

When the control lever of the master control 18 is shifted from the neutral detent position to the "astern" detent position 4, full control air supply is applied through the "astern" outlet of the master control to the left hand operator of the reversing valve 34, to the high pressure operator of the "astern" clutch control valve 32, and through shuttle valve 40 to the top operator of the speed control valve 84. Pressure on the left hand operator of valve 74 causes its spool to shift rightward thereby venting its left outlet port and interconnecting its right outlet port to its inlet port. Pressure on the high pressure operator of valve 32, 2ith its low pressure operator being vented at valve 34, causes the spool of valve 32 to shift to interconnect its inlet port to its outlet port. Full control air supply pressure therefore is transmitted: (a) through clutch control valve 32, shuttle valve 42 and quick release valve 76, in that order, to the top operators of valves 70 and 86 and to the bottom operator of valve 84; (b) through the "astern" outlet port of the master control 18 and shuttle valve 40 to the top operator of valve 84; and (c) through valve 30 to the "astern" port of the clutch actuator 12; substantially simultaneously. Thus, the clutch actuator 12 causes the clutch to engage in its reverse mode, the spool of valve 70 shifts to exhaust its outlet port and thereby permit quick release valve 82 to vent the brake air boot 10 to release the brake, the spool of valve 84 remains stationary because of the balanced pressures on its operators, the spool of valve 86 shifts to block its upper inlet port and connect its lower inlet port to its outlet port thereby transmitting speed boost supply pressure to the governor positioner 14 to give the engine throttle a speed boost to prevent engine stall as the engine is clutched on line.

Full control air supply pressure is also transmitted through valves 32, 42 and 76 to timing valve 90. Control air supply pressure bleeds through valve 90 at a rate dependent on needle valve adjustment therein to reservoir 92 and thence to the bottom operator of valve 86. When the pressure on the bottom operator of valve 86 reaches full control air supply pressure, the pressure on both operators of valve 86 will balance, causing its spool to be spring returned to block its lower inlet port and to interconnect its upper inlet port to its outlet port thereby terminating the throttle speed boost and permitting transmission of the initial speed pressure, eg 5 psi, from the "-speed" outlet port of the master control 18 through valves 96,88 and 86 to the governor positioner 14. The initial speed pressure is also transmitted from the "speed" outlet port of the master control 18 through valves 34 and 38 to the low pressure operator of valve 30, thereby maintaining the spool of valve 30 stationary so that its outlet port remains vented, the high pressure operator of valve 30 being vented at the '-'ahead" port of the master control 18.

Shifting the control lever of the master control from detent position 48 to the "full speed" detent position 5 merely increases the speed pressure on the governor positioner 14. A sudden increase in speed pressure will be timed out by the adjustable needle valve restriction in flow control valve 88.

When the control lever of master control 18 is shifted from either "ahead" or "astern" detent positions to neutral, the respective left or right hand operator of reversing valve 34 and the high pressure operator of the respective clutch control valve 30 or 32 will be vented through the respective "ahead" or "astern" outlet port of the master control 18. Thus, the spool of valve 34, and the respective spool of valve 30 or 32 will be spring returned to their neutral positions and the pilot operators of valves 70, 84 and 86 will be vented to return the spool valves 70, 84 and 86 to their neutral positions. Consequently, the clutch actuator 10 will cause the clutch to disengage, governor positioner 14 will cause the engine throttle to return to idle, and the brake air boot 10 will fill to apply the brake, all simultaneously.

When the control lever of the master control is shifted from one directional condition through neutral to the opposite directional condition, for example shifted from full speed ahead to full speed astern—a so-called "crash reversal" condition from the forward mode into the reverse mode, the following results. The ports of the clutch actuator 12 will be vented to cause the clutch to return to neutral and held there for the duration of a neutral delay period, the port of the governor positioner 14 will be vented to cause the engine throttle to return to idle for the duration of the neutral delay period, and the brake air boot 10 will be filled to cause brake application to the output shaft for the duration of the neutral delay period, the duration of the neutral delay period being sufficient to enable the brake to halt rotation of the output shaft. At the end of the neutral delay period, pressure will be applied to the reverse port of clutch actuator 12 to cause the clutch to be engaged in its reverse mode, the brake air boot 10 will be vented to release the brake, and a speed boost pressure will be applied to the governor positioner 14 to prevent engine stall as the load is re-assumed by the engine. At the end of the speed boost, the pressure to the governor positioner 14 will increase to "full speed" in a timed manner thereby controllably raising the engine speed to full speed conditions.

These results are effected by the following occurrances in the control mechanism. The high pressure operator of valve 30 and the right hand operator of valve 34 are vented through the "ahead" outlet port of the master control 18, and full control air supply pressure is applied to the high pressure operator of valve 32 and to the left hand operator of valve 34. The spool of valve 34 shifts rightward thereby applying full "astern" speed pressure to the low pressure operator of valve 30 and venting the full speed "ahead" pressure from the low pressure operator of valve 32. The spool of valve 30 therefore returns to its neutral position thereby venting its outlet port. The spool of valve 32, however, remains in its neutral position despite the application of full control air supply pressure to its high pressure operator because the needle valve restriction in timing valve 36 prevents the immediate exhaust of the full "ahead" speed pressure from its low pressure operator. (The respective high and low pressure operators of valve 32 are so designed that any pressure level above a predetermined level, eg 10 psi, will counteract the effect of full control air supply pressure on its high pressure operator and therefore the outlet port of valve 32 will remain vented until the pressure level on its low pressure operator falls below that predetermined level.) Therefore, the condition at both valves 30 and 32 is that their respective outlet ports are vented and the remainder of the circuit downstream of these valves functions as though the control lever of the master control 18 had been shifted to the neutral detent position.

As soon as the spool of reversing valve 34 has shifted rightward, the full "ahead" speed pressure on the low pressure operator begins to bleed through the timing valve 36 to vent at valve 34 at a rate dependent on the adjustment of the needle valve. When the pressure level on the low pressure operator of valve 32 reaches the aforementioned predetermined level, eg 10 psi, the spool of valve 32 will shift to interconnect its inlet and outlet ports. The period between the rightward shift of the spool of valve 34 and the eventual shift of the spool of valve 32 is the "reverse" neutral delay period. Since the pressure on the low pressure operator of valve 32 is the "ahead speed" pressure which causes actuation of the governor positioner 14, the duration of the "reverse" neutral delay period will be proportional to the engine speed at the onset of the "crash reversal" condition. By emperical determination of the time required for the shaft brake to halt the shaft from full speed, the needle valve of timing valve 36 can be adjusted to provide a "reverse" neutral delay period duration sufficient to match the braking time required. At such a setting, the neutral delay period duration will be adequately proportional to required braking time at all engine speed conditions less than full speed.

Upon shift of the spool of valve 32 at the end of the "reverse" neutral delay period, the circuit downstream of valves 30 and 32 functions as though the control lever of the master control valve had been shifted from neutral to the full speed astern detent position 5.

When the control lever of the master control is shifted in the opposite "crash reversal" condition, i.e. from the reverse mode to the forward mode, the following results. The ports of the clutch actuator 12 will be vented to cause the clutch to return to neutral and held there for the duration of a neutral delay period, the port of the governor positioner 14 will be vented to cause the engine throttle to return to idle for the duration of the neutral delay period, and the brake air boot 10 will be filled to cause brake application to the output shaft for the duration of the neutral delay period, the duration of the neutral delay period being sufficient to enable the brake to halt rotation of the output shaft. At the end of the neutral delay period, pressure will be applied to the forward port of clutch actuator 12 to cause the clutch to be engaged in its forward mode, the brake air boot 10 will be vented to release the brake, and a speed boost pressure will be applied to the governor positioner 14 to prevent engine stall as the load is reassumed by the engine. At the end of the speed boost, the pressure to the governor positioner 14 will increase to "full speed" in a timed manner thereby controllably raising the engine speed to full speed conditions.

These results are effected by the following occurrences in the control mechanism. The high pressure operator of valve 32 and the left hand operator of valve 34 are vented to the "reverse" outlet port of the master control 18, and full control air supply pressure is applied to the high pressure operator of valve 30 and to the right hand operator of valve 34. The spool of valve 34 shifts leftward thereby applying full "ahead" speed pressure to the low pressure operator of valve 32 and venting the full speed "astern" pressure from the low pressure operator of valve 30. The spool of valve 32 therefore returns to its neutral position thereby venting its outlet port. The spool of valve 30, however, remains in its neutral position despite the application of full control air supply pressure to its high pressure operator, because the needle valve restriction in timing valve 38 prevents the immediate exhaust of the full "astern" speed pressure from its low pressure operator. (The respective high and low pressure operators of valve 30 are so designed that any pressure level above a predetermined level, eg 10 psi, will counteract the effect of the full control air supply pressure on its high pressure operator and therefore the outlet port of valve 30 will remain vented until the pressure level on its low pressure operator falls below the predetermined level.) Therefore, the condition at both valves 30 and 32 is that their respective outlet ports are vented and the remainder of the circuit downstream of these valves functions as through the control lever of the master control 18 had been shifted to the neutral detent position 1.

As soon as the spool of reversing valve 34 has shifted leftward, the full "astern" speed pressure on the low pressure operator begins to bleed through the timing valve 38 to vent at valve 34 at a rate dependent on the adjustment of the needle valve. When the pressure level on the low pressure operator of valve 30 reaches the aforementioned predetermined level, eg 10 psi, the spool of valve 30 will shift to interconnect its inlet and outlet ports. The period between the leftward shift of the spool of valve 34 and the eventual shift of the spool of valve 30 is the "forward" neutral delay period. Since the pressure on the low pressure operator of valve 30 is the "astern speed" pressure which causes actuation of the governor positioner 14, the duration of the "forward" neutral delay period will be proportional to the engine speed at the onset of the "crash" reversal" condition. By an empirical determination of the time required for the shaft brake to halt the shaft at full speed, the needle valve and the timing valve 38 can be adjusted to provide a "forward" neutral delay period duration sufficient to match the braking time required. At such a setting, the neutral delay period duration will be adequately proportioned to required braking time at all engine speed conditions less than full speed.

Upon shifting of the spool of valve 30 at the end of the "forward" neutral delay period, the circuit downstream of valves 30 and 32 functions as though the control lever of the master control valve had been shifted from neutral to the full speed ahead detent position 3.

In FIG. 2 (wherein idenity numerals of components having similar functions to those of FIG. 1 have been increased by a multiple of 100), an air brake assembly including an air-operated boot-type brake 110 that encloses a section of an output drive shaft (not shown), an air clutch assembly including an "ahead" air-operated boot-type clutch 112a and an air-operated boot-type "astern" clutch 112b, and an engine governor assembly including an air-operated spring-returned governor positioner 114 are selectively operated by a control mechanism 116 in response to command signals transmitted from a master control 18 of the control mechanism.

The master control 18 may be identical to that depicted in FIG. 1 comprising a single-lever control valve having a supply air input 120, and a "speed" output 122, an "astern" output 124, and an "ahead" output 126. The valve is designed such that the input port is blocked and the output ports are vented when the control lever is in the "neutral" detent position 1 shown in solid line. With the control lever in the "ahead" detent position 2 shown in dashed lines, the "ahead" output port supplies full line pressure, the "astern" port is vented, and the "speed" output port supplies an initial pressure—typically 5 psi—that varies up to some maximum pressure—typically 65—in proportion to the degree of lever advancement as the lever control is advanced to the full speed ahead detent position 3 shown in dashed lines. With the control lever in the "astern" detent position 4 shown in dashed lines, the "astern" port supplies full line pressure, the "ahead" port is vented, and the "speed" output port supplies an initial pressure—typically 5 psi—that varies up to some maximum pressure—typically 65 psi—in proportion to the degree of lever advancement as the control lever is advanced to the full speed astern detent position 5 shown in dashed lines.

The clutch control means of the control mechanism comprises an "ahead" clutch control valve 130, a "reverse" clutch control valve 132, a clutch reversing valve 134, a forward-to-reverse neutral delay timing valve 136, a reverse-to-forward neutral delay timing valve 138, a directional shuttle valve 140, a speed shuttle valve 142, "astern" clutch engagement control valve 131, "ahead" clutch engagement valve 135, "astern" clutch engagement timing valve 133, and "ahead" clutch engagement timing valve 137. Clutch control valves 130 and 132 each comprise a double pilot-operated and spring-returned three-way spool valve with a high pressure pilot operator at one end and a low pressure pilot operator at the other end. Clutch reversing valve 134 comprises a double pilot-operated and spring-centered four-way spool valve with an exhaust center. Timing valves 136, 138, 133, and 137 each comprise a flow control valve with free flow in the direction of the arrow and with flow restricted in the opposite direction by an adjustable needle valve. Shuttle valves 140 and 142 each comprise an isolation type valve having two input ports and one output port wherein the two inputs are isolated with the lower pressure input port blocked and the higher pressure input port open to the output port. Clutch engagement control valves 131 and 135 each comprise a relay valve wherein an incoming pressure signal is blocked until the downstream pressure exceeds a predetermined and adjustable level whereupon the valve opens fully.

The "ahead" output port of the master control 18 is in fluid communication with the high pressure operator of control valve 130 through line 126, with the right hand operator of reversing valve 134 through lines 126 and 144, and with the right hand input port of shuttle valve 140 through lines 126 and 146. The "astern" output port of the master control 18 is in fluid communication with the high pressure operator of control valve 132 through line 124, with the left hand operator of reversing valve 134 through lines 124 and 148, and with the left hand input port of shuttle valve 140 through lines 124 and 150. The "speed" output port of the master control 18 is in fluid communication with the input port of reversing valve 134 through line 122. The right hand output port of reversing valve 134 is in fluid communication with the low pressure operator of control valve 130 through line 152 and timing valve 138, and the left-hand output port of reversing valve 134 is in fluid communication with the low pressure operator of control valve 132 through line 154 and timing valve 136. The input port of each control valve, 130 and 132, is in fluid communication with the control air supply through lines 156 and 158, respectively. The output port of control valve 130 is in fluid communication with the right hand inlet port of shuttle valve 142 through line 162, and with the "ahead" clutch air-boot 112a through line 166 and clutch engagement control and timing valves 135 and 137. The output port of control valve 132 is in fluid communication with the left hand inlet port of shuttle valve 142 through line 164, and with the "astern" clutch air-boot 112b through line 168 and clutch engagement control and timing valves 131 and 133.

The brake control means comprises a single low-pressure pilot operated and spring-returned three-way spool valve 170, and a brake shuttle valve 171. The operator of valve 170 is in fluid communication with the outlet port of shuttle valve 171 through line 172. The input port of valve 170 is in fluid communication with brake air supply through lines 178 and 156, and the output port of valve 170 is in fluid communication with the brake air-boot 110 through line 180 and quick-release valve 182. The right hand inlet port of shuttle valve 171 is in fluid communication with the outlet port of control valve 130 through line 173 connecting into line 166 downstream of the "ahead" clutch engagement control and timing valves 135 and 137, and the left-hand inlet port of shuttle valve 171 is in fluid communication with the outlet port of control valve 132 through line 175 connecting into lines 168 downstream of the "astern" clutch engagement control and timing valves 131 and 133.

The throttle control means comprises a speed and speed-boost control valve 186, a speed timing valve 188 and a speed boost regulating valve 189. Control valve 186 comprises a double pilot-operated and spring-returned three-way spool valve. The timing valve 188 comprises a flow control valve with free flow in the direction of the arrow with flow restricted in the opposite direction by an adjustable needle valve. The regulating valve 189 comprises an adjustable pressure reducing valve. The left hand operator of valve 186 is in fluid communication with the outlet port of shuttle valve 140 through line 174, and the right hand operator of valve 186 is in fluid communication with the outlet port of shuttle valve 171 through line 198. The left-hand inlet port of valve 186 is in fluid communication with the speed outlet port of master control 18 through lines 202 and 122 and timing valve 188. The right hand inlet port of valve 186 is in fluid communication with the outlet port of shuttle valve 142 through line 204 and pressure regulating valve 189. The outlet port of the valve 186 is in fluid communication with the port of the governor positioner 114 through line 206.

When the control lever of the master control 18 is in its neutral detent position as shown, the respective spools of the control valves are spring-positioned to provide the internal porting depicted by the solid lines, all pilot operators being vented. The inlet port of each control valve 130 and 132 is blocked and its outlet is vented. The inlet port and outlet of valve 170 are interconnected. The left hand inlet port of valve 186 is connected to its outlet port. The "ahead," "astern" and "speed" outlet ports of the master control 18 are vented. Thus, the clutch air-boots 112a and 112b are exhausted through quick release valves 167 and 169, respectively, the governor positioner 114 is self-positioned at "idle" and it "-speed" air line 206 exhausted through the master control "-speed" outlet port, and the brake is applied with the brake air boot 110 filled with brake supply air through line 178, valve 170 and line 180. Control air supply is blocked at the inlet port of the master control valve and at the inlet ports of control valves 130 and 132.

When the control lever of the master control 18 is shifted from neutral to the "ahead" detent position 2, full control air supply pressure is applied through the "ahead" outlet port of the master control to the right hand operator of reversing valve 134, to the high pressure operator of the "ahead" clutch control valve 130, and through shuttle valve 140 to the left hand operator of the speed control valve 186. Pressure on the right hand operator of valve 134 causes its spool to shift leftward thereby venting its right outlet port and interconnecting its left outlet port to its inlet port. Pressure on the high pressure operator of the valve 130, with its low pressure operator being vented at valve 134, causes the spool of valve 130 to shift to interconnect its inlet port to its outlet port. Full control air supply pressure therefore is transmitted: (a) through clutch control valve 130, first through flow control valve 137 and then through clutch engagement control valve 135, and shuttle valve 171 to the right hand operator of valve 186 and to the low pressure operator of valve 170; (b) through control valve 130, and first through flow control valve 137 and then through clutch engagement control valve 135 to the clutch air boot 112a; (c) through clutch control valve 130, shuttle valve 142 and line 204 and regulator valve 189 to the right hand inlet port of valve 186; and (d) through the "ahead" outlet port of the master control 18 and shuttle valve 140 to the left hand operator of valve 186; substantially simultaneously. Thus, the clutch is engaged in its forward mode as the clutch air boot 112a is filled, the air boot being filled under "soft-fill conditions caused by pressure being supplied through the needle valve adjustment of flow control valve 137 until the predetermined pressure level below clutch engagement control valve 135 is reached and the latter valve freely passes the pressure to the clutch air boot 112a. The spool of valve 170 shifts to exhaust its outlet port thereby venting the brake air boot 110 at the quick release valve 182 to release the brake, the spool valve 186 shifts rightward to block its left hand inlet port and connect its right hand inlet port to its output port thereby transmitting speed boost supply pressure through valve 189 to the governor positioner 114 to give the engine throttle a speed boost to prevent engine stall as the engine is clutched on the line. As the pressure downstream of the clutch engagement control valve 135 increases, as supply pressure bleeds through flow control valve 137 to the predetermined level necessary to effect the full opening of valve 135, the pressure at the right hand operator of valve 186 will thereafter rapidly increase to the level necessary to balance the pressures across the operators of valve 186 thereby shifting its spool leftward to its neutral position to block the right hand inlet port and to connect its left hand inlet port to its outlet port thereby terminating the throttle speed boost and permitting transmission of the initial speed pressure, eg 5 psi, from the "speed" outlet port of the master control 18 through valve 186 to the governor positioner 114. The initial speed pressure is also transmitted from the "speed" outlet port of the master control 18 through valves 134 and 136 to the low pressure operator of valve 132, thereby maintaining the spool of valve 132 stationary so that its outlet port remains vented since the high pressure operator of valve 132 is vented at the "astern" port of the master control 18.

Shifting the control lever of the master control from detent position 2 to "full speed," detent position 3 merely increases the speed pressure on the governor positioner 114. A sudden increase in speed pressure will be timed out by the adjustable needle valve restriction in flow control valve 188.

When the control lever of the master control 118 is shifted from the neutral detent position to the "astern" detent position 4, the full control air supply is applied through the "astern" outlet of the master control to the left hand operator of the reversing valve 134, to the high pressure operator of the "astern" clutch control valve 132, and through shuttle valve 140 to the left hand operator of the speed control valve 186. Pressure on the left hand operator of valve 134 causes its spool to shift rightward thereby venting its left outlet port and interconnecting its right outlet port to its inlet port. Pressure on the high pressure operator of vaLve 132, with its low pressure operator being vented at valve 134, causes the spool of valve 132 to shift to interconnect its inlet port to its outlet port. Full control air supply pressure therefore is transmitted: (a) through clutch control valve 132 and shuttle valve 142 to the right hand inlet port of valve 186; (b) through clutch control valve 132, first through flow control valve 133 and then through clutch engagement control valve 131, and through shuttle valve 171 to the low pressure operator of brake control valve 170 and the right hand operator of valve 186; (c)

through clutch control valve 132, and first through flow control valve 133 and then through clutch engagement control valve 131 to the clutch air boot 112b; and (d) through the "astern" outlet port of the master control 18 and shuttle valve 140 to the left hand operator of valve 186; substantially simultaneously. Thus, the clutch is engaged in its reverse mode as the clutch air boot 112b is filled, the air boot being filled under "soft fill" conditions caused by pressure being supplied through the needle valve adjustment of flow control valve 133 until the predetermined pressure level below clutch engagement control valve 131 is reached and the latter valve freely passes the pressure to the clutch air boot 112b. The spool of valve 170 shifts to exhaust its outlet port thereby venting the brake air boot 110 to release the brake, the spool of valve 186 shifts rightward to block its left hand inlet port thereby transmitting speed boost supply pressure from regulator 189 to the governor positioner 114 to give the engine throttle a speed boost to prevent engine stall as the engine is clutched on line. As the pressure downstream of the clutch engagement control valve 131 increases, as supply pressure bleeds through flow control valve 133, to the predetermined level necessary to effect the full opening of valve 131 the pressure at the right hand operator of valve 186 will thereafter rapidly increase to the level necessary to balance the pressures across the operators of valve 186 thereby shifting the spool leftward to block the right hand inlet port and to connect its left hand inlet port to its outlet port thereby terminating the throttle speed boost and permitting transmission of the initial speed pressure, eg 5 psi, from the "speed" outlet port of the master control 18 through valve 186 to the governor positioner 114. The initial speed pressure is also transmitted from the "speed" outlet port of the master control 18 through valves 134 and 138 to the low pressure operator of valve 130, thereby maintaining the spool of valve 130 stationary so that its outlet port remains vented since the high pressure operator of valve 130 is vented at the "ahead" port of the master control 18.

Shifting of the control lever of the master control from the detent position 4 to the "full speed" detent position 5 merely increases the speed pressure on the governor positioner 114. A sudden increase in speed pressure will be timed out by the adjustable needle valve restriction in flow control valve 188.

When the control lever of master control 118 is shifted from either "ahead" or "astern" detent positions to neutral, the respective left or right hand operator of reversing valve 134 and the high pressure operator of the respective clutch control valve 130 or 132 will be vented through the respective "ahead" or "astern" outlet port of the master control 18. Thus, the spool of valve 134, and the respective spool of valve 130 or 132 will be spring returned to their neutral positions and the pilot operators of valves 170 and 186 will be vented to return the spools of valve 170 and 186 to their neutral positions. Consequently, the respective clutch air boot 112a or 112b will be vented to cause the clutch to disengage, governor positioner 114 will cause the engine throttle to return to idle, and the brake air boot 110 will fill to apply the brake, all simultaneously.

When the control lever of the master control is shifted under "crash reversal" conditions, for example from the forward mode into the reverse mode the following results. The forward clutch air bag 112a is vented at quick release valve 167 to cause the clutch to return to neutral and held there for the duration of the neutral delay period, the port of the governor positioner 114 will be vented to cause the engine throttle to return to idle for the duration of the neutral delay period, and the brake air boot 110 will be filled to cause brake application to the output shaft for the duration of the neutral delay period, the duration of the neutral delay period being sufficient to enable the brake to halt rotation of the output shaft. At the end of the neutral delay period, pressure will be applied to the clutch air boot 112b to cause the clutch to be engaged in its reverse mode, the brake air boot 110 will be vented to release the brake, and a speed boost pressure will be applied to the governor positioner 114 to prevent engine stall as the load is reassumed by the engine. At the end of the speed boost, the pressure to the governor positioner 114 will increase to "full speed" in a timed manner thereby controllably raising the engine speed to full speed conditions.

These results are effected by the following occurrences in the control mechanism. The high pressure operator of valve 130 and the right hand operator of valve 134 are vented through the "ahead" outlet port of master control 18, and full control air supply pressure is applied to the high pressure operator of valve 132 and to the left hand operator of valve 134. The spool of valve 134 shifts rightward thereby applying full "astern" speed pressure to the low pressure operator of valve 130 and venting the full speed "ahead" pressure from the low pressure operator of valve 132. The spool of valve 130 therefore returns to its neutral position thereby venting its outlet port. The spool of valve 132, however, remains in its neutral position despite the application of full control air supply pressure to its high pressure operator because the needle valve restriction in timing valve 136 prevents the immediate exhaust of the full "ahead" speed pressure from its low pressure operator. (The respective high and low pressure operators of valve 132 are so designed that any pressure level above a predetermined level, eg 10 or 12 psi, will counteract the effect of the full control air supply pressure on its high pressure operator and therefore the outlet port of valve 132 will remain vented until the pressure level on its low pressure operator falls below the predetermined level.) Therefore, the condition at both valves 130 and 132 is that their respective outlet ports are vented and the remainder of the circuit downstream of these valves functions as though the control lever of the master control 18 has been shifted to the neutral detent position 1.

As soon as the spool of reversing valve 134 has shifted rightward, the full "ahead" speed pressure on the low pressure operator of valve 132 begins to bleed through the timing valve 136 to vent at valve 134 at a rate dependent on the adjustment of the needle valve. When the pressure level on the low pressure operator of valve 132 reaches the aforementioned predetermined level, eg 10 psi, the spool of valve 132 will shift to interconnect its inlet and outlet ports. The period between the rightward shift of the spool of valve 134 to the eventual shift of the spool of valve 132 is the "reverse" neutral delay period. Since the pressure on the low pressure operator of valve 132 is the "ahead" speed pressure which causes actuation of the governor positioner 114, the duration of the "reverse" neutral delay period will be proportional to the engine speed at the onset of the "crash reversal" condittion. By empircal determination of the time required for the shaft brake to halt the shaft from full speed, the needle valve of the timing valve 136 can be adjusted to provide a "reverse" neutral delay period duration sufficient to match the braking time required. At such a setting the neutral delay period duration will be adequately proportioned to required braking time at all engine speed conditions less than full speed.

On shift of the spool of valve 132 at the end of the "reverse" neutral delay period, the circuit downstream of valves 130 and 132 functions as though the control lever of the master control valve had been shifted from neutral to the full speed astern detent position 5.

When the control lever of the master control is shifted to put into effect a "crash reversal" condition in the opposite direction, from the reverse mode to the forward mode, the sequence of occurrences in the control mechanism is as follows. The high pressure operator of valve 132 and the left hand operator of valve 134 are vented through the "astern" outlet port of the master control 18, and full control air supply pressure is applied to the high pressure operator of valve 130 and to the right hand operator of valve 134. The spool of valve 134 shifts leftward thereby applying full "ahead" speed pressure to the low pressure operator of valve 132 and venting the full speed "astern" pressure from the low pressure operator of valve 130. The spool of valve 132 therefor returns to its neutral position thereby venting its outlet port. The spool of valve 130, however, remains in its neutral position despite the application of full control air supply pressure to its high pressure operator because the needle valve restriction in timing valve 138 prevents the immediate exhaust of the full "astern" speed pressure from its low pressure operator. (The respective high and low pressure operators of valve 130 are so designed that any pressure level above a predetermined level, eg 10–12 psi, will counteract the effect of full control air supply pressure on its high pressure operator and therefore the outlet port of valve 130 will remain vented until the pressure level on its low pressure operator falls below the predetermined level.) Therefore, the condition at both valves 130 and 132 is that their respective outlet ports are vented and the remainder of the circuit downstream of these valves functions as though the control lever of the master control 18 had been shifted to the neutral detent position 1.

As soon as the spool of reversing valve 134 has shifted leftward, the full "astern" speed pressure on the low pressure operator of valve 130 begins to bleed through the timing valve 138 to vent at valve 134 at a rate dependent on the adjustment of the needle valve. When the pressure level on the low pressure operator of valve 130 reaches the aforementioned predetermined level, eg 10 psi, the spool of valve 130 will shift to interconnect its inlet and outlet ports. The period between the leftward shift of the spool of valve 134 and the eventual shift of the spool of valve 130 is the "forward" neutral delay period. Since the pressure on the low pressure operator of valve 130 is the "astern" speed pressure which causes actuation of the governor positioner 114, the duration of the "forward" neutral delay period will be proportional to the engine speed at the onset of the "crash reversal" condition. By emperical determination of the time required for the shaft brake to halt the shaft from full speed, the needle valve of timing valve 138 can be adjusted to produce a "forward" neutral delay period duration sufficient to match the braking time required. At such a setting, the neutral delay period duration will be adequately proportioned to the required braking time at all engine speed conditions less than full speed.

Upon shift of the spool of valve 130 at the end of the "forward" neutral delay period, the circuit downstream of valves 130 and 132 functions as though the control lever of the master control valve had been shifted from neutral to the full speed ahead detent position 5.

In the FIG. 3 control mechanism 216 (wherein identity numerals of components having similar functions to those of FIG. 1 have been increased by a multiple of 200 over the FIG. 1 numerals, and wherein identity numerals of components having similar functions to those of FIG. 2 have been increased by a multiple of 100 over the FIG. 2 numerals), it is assumed that the master control 18, of the FIG. 1 type, would be employed with the FIG. 3 circuit and connected to the "ahead," "speed" and "astern" output lines 226, 222 and 224, respectively, of FIG. 3 in the same manner as it is connected to the functionally similar lines 26, 22 and 24, respectively of FIG. 1. Also, it is assumed that the air brake assembly including an air-operated boot-type brake 10, the hydraulic clutch assembly including an air-operated double acting and spring centered hydraulic pump swashplate actuator 12, and an engine governor assembly including an air-operated spring returned governor positioner 14, all of the FIG. 1 type, would be employed with the FIG. 3 circuit and connected to the air lines 280, 266, 268 and 306, respectively, of FIG. 3 in the same manner as they are connected to the functionally similar air lines 80, 66, 68 and 106, respectively, of FIG. 1.

The clutch control means of the FIG. 3 control mechanism comprises an "ahead" clutch control valve 230, a "reverse" clutch control valve 232, a forward-to-reverse neutral delay timing valve 236, a reverse-to-forward neutral delay timing valve 238, a directional shuttle valve 240, and a speed shuttle valve 242. Clutch control valves 230 and 232 each comprise a double pilot-operated and spring-returned three-way spool valve with a high pressure pilot operator at one end and a low pressure operator at the other end. Timing valve 236 and 238 each comprise a flow control valve with free flow in the direction of the arrow and with flow restricted in the opposite direction by an adjustable needle valve. Shuttle valves 240 and 242 each comprise an isolation type valve having two input ports and one output port wherein the two inputs are isolated with the lower pressure input port blocked and the higher pressure input port open to the output port.

The "ahead" output port of the master control is in fluid communication with the high pressure operator of control valve 230 through line 226, and with the right hand input port of shuttle valve 240 through lines 246 and 226. The "astern" output port of the master control is in fluid communication with the high pressure operator of control valve 232 through line 224, and with the left hand input port of shuttle valve 240 through lines 250 and 224. The input port of each control valve, 230 and 232, is in fluid communication with the control air supply through lines 256 and 258, respectively. The output port of control valve 230 is in fluid communication with the right hand inlet port of shuttle valve 242 through line 262, and with the "ahead" port of the clutch actuator through line 266. The low pressure operator of control valve 230 is in fluid communication with the outlet port of control valve 232 through line 254, timing valve 238 and line 268. The low pressure operator of control vslve 232 is in fluid communication with the outlet port of control valve 230 through line 252, timing valve 236 and line 266.

The brake control means comprises a single pilot operated and spring returned three-way spool valve 270. The operator of valve 270 is in fluid communication with the output port of shuttle valve 242 through lines 272 and 298. The input port of valve 270 is in fluid communication with the brake air supply through line 278, and the output port of valve 270 is in fluid communication with the brake air boot through line 280.

The throttle control means comprises a speed boost and speed control valve 286, a speed timing valve 288, a speed boost timing valve 290, a reservoir 292, and a speed boost regulating valve 289. Control valve 286 comprises a double pilot operated and spring returned three-way spool valve. Timing valves 288 and 290 each comprises a flow cottrol valve with free flow in the direction of the arrow with flow restricted in the opposite direction by an adjustable needle valve. The regulating valve 289 comprises an adjustable pressure reducing valve. The left hand operator of valve 286 is in fluid communication with the outlet port of shuttle valve 240 through line 274, and the right hand operator of valve 286 is in fluid communication with the outlet port of shuttle valve 242 through reservoir 292, timing valve 290, and line 298. The left hand inlet port of valve 286 is in fluid communication with the speed outlet port of the master control through line 222 and timing valve 288. The right hand inlet port of valve 286 is in fluid communication with the outlet port of shuttle valve 242 through line 304 and pressure regulating valve 289. The outlet port of the valve 286 is in fluid communication with the port of the governor positioner 14 through line 306.

When the control lever of the master control is in its neutral detent position, the respective spools of the control valves are spring positioned to provide the internal porting depicted by the solid lines, all pilot operators being vented. The inlet port of each control valve 230 and 232 is blocked and its outlet is vented. The inlet and outlet ports of valve 270 are interconnected. The left hand inlet port of valve 286 is connected to its outlet port. The "ahead," "astern" and "speed" outlet ports of the master control are vented. Thus, the clutch actuator is self positioned in neutral with its "ahead" and "astern" air lines 266 and 268 exhausted through the master control "speed" outlet port, the brake is applied with the brake air boot filled with brake supply air through line 278, valve 270 and line 280. Control air supply is blocked at the inlet port of the master control valve and at the inlet ports of control valves 230 and 232.

When the control lever of the master control is shifted from neutral to the "ahead" detent position, full control air supply pressure is applied through the "ahead" outlet port of the master control to the high pressure operator of the "ahead" clutch control valve 230, and through shuttle valve 240 to the left hand operator of the speed control valve 286. Pressure on the high pressure operator of the valve 230, with its low pressure operator being vented through line 254, valve 238 and line 268 and through valve 232, causes the spool of valve 230 to shift to interconnect its inlet port to its outlet port. Flow control air supply pressure, therefore, is transmitted: (a) through clutch control valve 230, and shuttle valve 242 to the right hand operator of valve 286 through timing valve 290 and to the pilot operator of valve 270; (b) to control valve 230, shuttle valve 242, and line 304 and regulator valve 289 to the right hand inlet of valve 286; (c) through control valve 230 to the clutch actuator; (d) through the "ahead" outlet port of the master control and shuttle valve 240 to the left hand operator of valve 286; and (e) through clutch control valve 230 and timing valve 236 to the low pressure operator of valve 232; substantially simultaneously. Thus the clutch actuator causes the clutch to engage in its forward mode, the spool of valve 270 shifts to exhaust its outlet port thereby venting the brake air boot to release the brake, and the spool of valve 286 shifts rightward to block its left hand inlet port and connect its right hand inlet port to its output thereby transmitting speed boost supply pressure through valve 289 to the governor positioner to give the engine a throttle speed boost to prevent engine stall as the engine is clutched on the line. As the control air supply pressure bleeds through timing valve 290 at a rate dependent on the needle valve adjustment therein to reservoir 292 and thence to the right hand operator of valve 286, the spool of valve 286 will shift leftward as the pressure on its right hand operator reaches full control air supply pressure, thereby causing its spool to block its right hand inlet port and to interconnect its left hand inlet port to its outlet port thereby terminating the throttle speed boost and permitting transmission of the initial speed pressure from the "speed" outlet port of the master control through valve 286 to the governor positioner.

Shifting the control lever of the master control to the "full speed ahead" detent position merely increases the speed pressure on the governor positioner. A sudden increase in speed pressure will be timed out by the adjustable needle valve restriction in flow control valve 288.

When the control lever of the master control is shifted from the neutral detent position to the "astern" detent position, the flow control air supply pressure is applied through the "astern" outlet of the master control to the high pressure operator of the "astern" clutch control valve 232, and through shuttle valve 240 to the left hand operator of the speed control valve 286. Pressure on the high pressure operator of valve 232, with its low pressure operator being vented through line 252, timing valve 236 and line 266 of valve 230, causes the spool of valve 232 to shift to interconnect its inlet port with its outlet port. Full control air supply pressure therefore is transmitted: (a) through clutch control valve 232 and shuttle valve 242, and line 298 to the operator of valve 270 and to the right hand operator of valve 286 through valve 290; (b) through clutch control valve 232, shuttle valve 242, and reducing valve 289 to the right hand inlet port of valve 286; (c) through clutch control valve 232 and timing valve 238 to the low pressure operator of valve 230; (d) through clutch control valve 232 to the "astern" port of the clutch actuator; and (e) through the "astern" outlet port of the master control and shuttle valve 240 to the left hand operator of valve 286; substantially simultaneously. Thus, the clutch actuator causes the clutch to engage in its reverse mode, the spool of valve 270 shifts to exhaust its outlet port thereby venting the brake air boot to release the brake, the spool of valve 286 shifts to block its left hand inlet port and connect its right hand inlet port to its outlet port thereby transmitting a speed boost pressure signal to the governor positioner to give the engine throttle speed boost to prevent engine stall as the engine is clutched on the line. As the pressure on the right hand operator of valve 286 reaches full control air supply pressure, bleeding through timing valve 290 into reservoir 292, the pressure on both operators of valve 286 will balance and cause its load to be spring returned to block its right hand inlet port and to interconnect its left hand inlet port to its outlet port thereby terminating the throttle speed boost permitting transmission of the initial speed pressure from the "speed" outlet port of the master control through valve 286 to the governor positioner.

Shifting the control lever for the master control to the "full speed astern" detent position merely increases speed pressure on the governor positioner. A sudden increase in speed pressure will be timed out by the adjustable needle valve restriction in flow control valve 288.

When the control lever of master control 18 is shifted from either the "ahead" or the "astern" detent position to neutral, the high pressure operator of the respective clutch control valve 230 or 232 will be vented through the respective "ahead" or "astern" outlet port of the master control. Thus, the respective spool of valve 230 or 232 will be spring returned to its neutral position and the pilot operators of valve 270 and 286 will be vented to return the spool of valve 270 and 286 to their neutral positions. Consequently, the respective clutch actuator will be vented to cause the clutch to disengage, the governor positioner will cause the engine throttle to return to idle, and the brake air boot will fill to apply the brake, all simultaneously.

When the control lever of the master control is shifted under "crash reversal" conditions, for example from the forward mode into the reverse mode the following results. The ports of the clutch actuator will be vented to cause the clutch to return to neutral and held there for the duration of a neutral delay period, the port of the governor positioner will be vented to cause the engine throttle to return to idle for the duration of the neutral delay period, and the brake air boot will be filled to cause brake application to the output shaft for the duration of the neutral delay period, the duration of the neutral delay period being sufficient to permit the brake to halt rotation of the output shaft. At the end of the neutral delay period, pressure will be applied to the reverse port of the clutch actuator and cause the clutch to be engaged in its reverse mode, the brake air boot will be vented to release the brake, and a speed boost pressure will be applied to the governor positioner to prevent engine stall as the load is reassumed by the engine At the end of the speed boost, the pressure to the governor positioner will increase to "full speed" in a timed manner thereby controllably raising the engine speed to full speed conditions.

These results are effected by the following occurrances in the control mechanism. The high pressure operator of valve 230 is vented to the "ahead" outlet port of the master control, and full control air supply pressure is applied to the high pressure operator of valve 232. The spool of valve 230 is spring returned to its neutral position thereby venting its outlet port. The spool of valve 232, however, remains in its neutral position despite the application of full control air supply pressure to its high pressure operator because the needle valve restriction in timing valve 236 prevents the immediate exhaust of the full control air supply pressure from its low pressure operator through the vented valve 230. (The respective high and low pressure operators of valve 232 are so designed that any pressure level above a predetermined level, eg 10 psi, will counteract the effect of full control air supply pressure on its high pressure operator and therefore the outlet port of valve 232 will remain vented until the pressure level on the low pressure operator falls below a predetermined level.) Therefore, the condition at both valves 230 and 232 is that their respective outlet ports are vented and the remainder of the circuit downstream of these valves functions as though the control lever of the master control had been shifted to the neutral detent position.

As soon as the spool of valve 230 has shifted to its neutral position, the full control air supply pressure at the low pressure operator of valve 232 begins to bleed through the timing valve 236 to vent at valve 230 at a rate dependent on the adjustment of the needle valve. When the pressure level on the low pressure operator of valve 232 reaches the aforementioned predetermined level, eg 10 psi, the spool of valve 232 will shift to interconnect its inlet and outlet ports. The period between the shift of the spool of valve 230 to the eventual shift of the spool of valve 232 is the "reverse" neutral delay period. Since the pressure on the low pressure operator of Valve 232 is the full control air supply pressure, operator of valve 232 is the full control air supply pressure, the duration of the "reverse" neutral delay period will be fixed and proportioned to the engine speed at the onset of the "crash reversal" condition. By emperical determination of the time required for the shaft brake to halt the shaft from full speed, the needle valve for the timing valve 236 can be adjusted to provide a "reverse" neutral delay period duration sufficient to match the braking time required. At such a setting the neutral delay period duration will be longer than the braking time required at engine speed conditions less than full speed, but this situation is entirely acceptable if the duration is not unduly long.

On shift of the spool of valve 232 at the end of the "reverse" neutral delay period, the circuit downstream of valve 230 and 232 functions as through the control lever of the master control valve had been shifted from neutral to the full speed astern detent position.

When the control lever of the master control is shifted to put into effect a "crash reversal" condition in the opposite direction, from the reverse mode to the forward mode, the sequence of the occurrances in the control mechanism is as follows. The high pressure operator of valve 232 is vented to the "astern" outlet port of the master control, and full control air supply pressure is applied to the high pressure operator of valve 230. The spool of valve 232 therefore returns to its neutral position thereby venting its outlet port. The spool of valve 230, however, remains in its neutral position despite the application of full control air supply pressure to its high pressure operator because the needle valve restriction in timing valve 238 prevents the immediate exhaust of the full control air supply pressure from its low pressure operator through the vented valve 232. (The respective high and low pressure operators of valve 230 are so designed that any pressure level above a predetermined level, eg 10 psi, will counteract the effect of full control air supply pressure on its high pressure operator and therefore the outlet port of valve 230 will remain vented until the pressure level on its low pressure operator falls below the predetermined level.) Therefore, the condition at both valves 230 and 232 is that their respective outlet ports are vented and the remainder of the circuit downstream of these valves functions as though the control lever of the master control had been shifted to the neutral detent position.

As soon as the spool of valve 232 has shifted to its neutral position, the full control air supply pressure on the low pressure operator of valve 230 begins to bleed through the timing valve 238 to vent at valve 232 at a rate dependent on the adjustment of the needle valve. When the pressure level on the low pressure operator of valve 230 reaches the aforementioned predetermined level, eg 10 psi, the spool of valve 230 will shift to interconnect its inlet and outlet ports. The period between the shift of the spool of valve 232 and the eventual shift of the spool of valve 230 is the "forward" neutral delay period. Since the pressure on the low pressure operator of valve 230 is the full control air supply pressure, the duration of the "forward" neutral delay period will be fixed and proportioned to the engine speed at the outset of the "crash reversal" condition. By emperical determination of the time required for the shaft brake to halt the shaft from full speed, the needle valve of timing valve 238 can be adjusted to provide a "forward" neutral delay period duration sufficient to match the braking time required. At such a setting, the neutral delay period duration will be longer than the required braking time at engine speed conditions less than full speed, but such is entirely satisfactory so long as the duration is not unduly long.

Upon shift of the spool of valve 230 at the end of the "forward" neutral delay period, the circuit downstream of the valves 230 and 232 functions as through the control lever of the master control had been shifted from neutral to the full speed astern detent position.

In the FIG. 4 control mechanism 316 (wherein the identity numerals of components having similar functions to those of FIG. 1 have been increased by a multiple of 300 over the FIG. 1 numerals, and wherein identity numerals of components having similar functions of FIG. 2 have been increased by a multiple of 200 over the FIG. 2 numerals), it is assumed that the master control 18, of the FIG. 1 type, would be employed with the FIG. 4 circuit and connected to the "ahead," "speed" and "astern" output lines 326, 322 and 324, respectively, of FIG. 4 in the same manner as it is connected to the functionally similar lines 26, 22 and 24, respectively, of FIG. 1. Also it is assumed that the air brake assembly including an air-operated boot-type brake 110, and air clutch assembly including an "ahead" air-operated boot-type clutch 112a and an "astern" air-operated boot-type clutch 112b, and an engine governor assembly including an air-operated spring-returned governor positioner 114, all of the FIG. 2 type, would be employed with the FIG. 4 circuit and connected to the air lines 380, 366, 368 and 406, respectively, of FIG. 2.

The clutch control means of the FIG. 4 control mechanism comprises an "ahead" clutch control valve 330, a "reverse" clutch control valve 332, a forward-to-reverse neutral delay timing valve 336, a reverse-to-forward neutral delay timing valve 338, a directional shuttle valve 340, a speed shuttle valve 342, an "astern" clutch engagement control valve 331, an "ahead" clutch engagement valve 335, an "astern" clutch engagement timing valve 333, and an "ahead" clutch engagement timing valve 337. CLutch control valves 330 and 332 each comprise a double pilot operated and spring returned three-way spool valve with a high pressure pilot operator at one end and a low pressure pilot operator at the other end. Timing valves 336, 338, 333, and 337 each comprise a flow control valve with free flow in the direction of the arrow and with flow restricted in the opposite direction by an adjustable needle valve. Shuttle valve 340 and 342 each comprise an isolation type valve having two input ports and one output port wherein the two inputs are isolated with the lower pressure input port blocked and the higher pressure input port open to the output port. Clutch engagement control valves 331 and 335 each comprise a relay valve wherein an incoming pressure signal is blocked until the downstream pressure exceeds a predetermined and adjustable level whereupon the valve opens fully.

The "ahead" output port of the master control is in fluid communication with the high pressure operator of control valve 330 through line 326, and with the right hand input port of shuttle valve 340 through lines 326 and 346. The "astern" output port of the master control is in fluid communication with the high pressure operator of control valve 332 through lines 324, and with the left hand input port of shuttle valve 340 through line 350 and 324. The input port of each control valve, 330 and 332, is in fluid communication with the control air supply through lines 356 and 358, respectively. The output port of control valve 330 is in fluid communication with the right hand inlet port of shuttle valve 342 through line 362, and with the "ahead" clutch air boot through line 366 and clutch engagement control and timing valves 335 and 337. The output port of control valve 332 is in fluid communication with the left hand inlet port of shuttle valve 342 through line 364, and with the "astern" clutch air boot through line 368 and clutch engagement control and timing valves 331 and 333. The low pressure operator of control valve 330 is in fluid communication with the outlet port of control valve 332 through line 354, timing valve 338 and line 368. The low pressure operator of control valve 332 is in fluid communication with the outlet port of control valve 330 through line 352, timing valve 336 and line 366.

The brake control means comprises a single pilot operated and spring returned three-way spool valve 370, and a brake shuttle valve 371. The operator of valve 370 is in fluid communication with the outlet port of shuttle valve 371 through line 372. The input port of valve 370 is in fluid communication with brake air supply through line 378, and the output port of valve 370 is in fluid communication with the brake air boot through line 380. The right hand inlet port of shuttle valve 371 is in fluid communication with the outlet port of control valve 330 through line 373 connecting into line 366 downstream of the "ahead" clutch engagement control and timing valves 335 and 337, and the left hand inlet port of shuttle valve 371 is in fluid communication with the outlet port of control valve 332 through line 375 connecting into line 368 downstream of the "astern" clutch engagement control and timing valves 331 and 333.

The throttle control means comprises a speed and speed boost control valve 386, a speed timing valve 388 and a speed boost regulating valve 389. Control valve 386 comprises a double pilot operated and spring returned three-way spool valve. The timing valve 388 comprises a flow control valve with free flow in the direction of the arrow with flow restricted in the opposite direction by an adjustable needle valve. The regulating valve 389 comprises an adjustable pressure reducing valve. The left hand operator of valve 386 is in fluid communication with the outlet port of shuttle valve 340 through line 374, and the right hand operator of valve 386 is in fluid communication with the outlet port of shuttle valve 371 through line 398. The outlet port of the valve 386 is in fluid communication with the port of the governor positioner through line 406. The left hand inlet port of valve 386 is in fluid communication with the speed outlet port of the master control through line 322 and timing valve 388. The right hand inlet port of valve 386 is in fluid communication with the outlet port of shuttle valve 342 through line 404 and pressure regulating valve 389.

When the control lever of the master control is in the neutral detent position, the respective spools of the control valves are spring positioned to provide the internal porting depicted by the solid lines, all pilot operators being vented. The inlet port of each control valve 330 and 332 is blocked and its outlet is vented. The inlet ports of the valve 370 are interconnected. The left hand inlet port of valve 386 is connected to its outlet port. The "ahead," "astern" and "speed" outlet ports of the master control are vented. Thus, the clutch air boots are exhausted, the governor positioner is self positioned at idle, and the brake is applied with the brake air boot filled with brake supply air. Control air supply is blocked at the inlet port of the master control valve and at the inlet ports of control valves 330 and 332.

When the control lever of the master control is shifted from neutral to the "ahead" detent position, fluid control air supply pressure is applied to the "ahead" outlet port of the master control to the high pressure operator of the "ahead" clutch control valve 330, and through shuttle valve 340 to the left hand operator of the speed control valve 386. Pressure on the high pressure operator of the valve 330, with its low pressure operator being vented through line 354, valve 338 and line 368 and through valve 332, causes the spool of valve 330 to shift to interconnect its inlet port to its outlet port. Flow control air supply pressure therefore is transmitted: (a) through clutch control valve 330, first through flow control valve 337 and then through clutch engagement control valve 335, and shuttle valve 371 to the right hand operator of valve 386 and to the low pressure operator of valve 370; (b) through control valve 330, and first through flow control valve 337 and then through clutch engagement control valve 335 to the "ahead" clutch air boot; (c) through clutch control valve 330, shuttle valve 342 and line 404 and regulator valve 389 to the right hand inlet port of valve 386; (d) through the "ahead" outlet port of the master control and shuttle valve 340 to the left hand operator of valve 386; and (3) through clutch control valve 330 and timing valve 336 to the low pressure operator of valve 332; substantially simultaneously. Thus the clutch is engaged in its forward mode as the "ahead" clutch air boot is filled, the air boot being filled under "soft fill" conditions caused by pressure being supplied through the needle valve restriction of flow control valve 337 until the predetermined pressure level below clutch engagement control valve 335 is reached and the latter freely passes the pressure to the "ahead" clutch air boot. The spool of valve 370 shifts to exhaust its outlet port thereby venting the brake air boot to release the brake, the spool of valve 386 shifts rightward to block its left hand inlet port and connect its right hand inlet port to its output port thereby transmitting speed boost supply pressure through valve 389 to the governor positioner to give the engine throttle a speed boost to prevent engine stall as the engine is clutched on the line. As the pressure downstream of the clutch engagement control valve 335 increases, as supply pressure bleeds through flow control valve 337 to the predetermined level necessary to effect the full opening of valve 335, the pressure at the right hand operator of valve 386 will thereafter rapidly increase to the level necessary to balance the pressure across the operators of 386 thereby shifting its spool leftward to its neutral position to block the right hand inlet port and to connect its left hand inlet port to its outlet port thereby terminating the throttle speed boost and permitting transmission of the initial speed pressure from the "-speed" outlet port of the master control through valve 386 to the governor positioner.

Shifting the control lever of the master control to the full "-full speed ahead" detent position merely increases the speed pressure on the governor positioner. A sudden increase in speed pressure will be timed out by the adjustable needle valve restriction in flow control valve 388.

When the control lever of the master control is shifted from the neutral detent position to the "astern" detent position, the full control air supply pressure is applied through the "astern" outlet in the master control to the high pressure operator of the "astern" clutch control valve 332, and through shuttle valve 340 to the left hand operator of the speed control valve 386. Pressure on the high pressure operator of valve 332, with its low pressure operator being vented through line 352 timing valve 336 and line 366 to valve 330, causes the spool of valve 332 to shift to interconnect its inlet port with its outlet port. Full control air supply pressure therefore is transmitted: (a) through clutch control valve 332 and shuttle valve 342 to the right hand inlet port of valve 386; (b) through clutch control valve 332, first through flow control valve 333 and then through clutch engagement control valve 331, and through shuttle valve 371 to the low pressure operator of brake control valve 370 and to the right hand operator of valve 386; (c) through clutch control valve 332, and first through flow control valve 333 and then through clutch engagement control valve 331 to the "astern" clutch air boot; (d) through the "astern" outlet port of the master control and shuttle valve 340 to the left hand operator of valve 386; and (e) through clutch control valve 332 and timing valve 338 to the low pressure operator of valve 330; substantially simultaneously. Thus, the "astern" clutch air boot is filled under "soft fill" condition caused by pressure being supplied through the needle valve adjustment of the flow control valve 333 until the predetermined pressure level below clutch engagement control valve 331 is reached and the latter valve freely passes the pressure to the "astern" clutch air boot. The spool of valve 370 shifts to exhaust its outlet port thereby venting the brake air boot to release the brake, the spool of valve 386 shifts rightward to block its left hand inlet port and to connect its right hand inlet port to its outlet port thereby transmitting speed boost supply pressure from regulator 389 to the governor positioner to give the engine throttle a speed boost to prevent engine stall as the engine is clutched on line. When the pressure downstream of the clutch engagement control valve 331 increases, as supply pressure bleeds through flow control valve 333, to the predetermined level necessary to effect the full opening of valve 331, the pressure at the right hand operator of valve 386 will thereafter rapidly increase to the level necessary to balance the pressure across the operators of valve 386 thereby shifting its spool leftward to block the right hand inlet port and to connect its left hand inlet port to its outlet port thereby terminating the throttle speed boost and permitting transmission of the initial speed pressure from the "speed" outlet port of the master control through valve 386 to the governor positioner.

Shifting the control lever for the master control to the "full speed astern" detent position merely increases the speed pressure on the governor positioner. A sudden increase in the speed pressure will be timed out by the adjustable needle valve restriction in flow control valve 388.

When the control lever of the master control is shifted from either "ahead" or "astern" detent positions to neutral, the high pressure operator of the respective clutch control valve 330 or 332 will be vented to the respective "ahead" or "astern" outlet port of the master control. Thus, the respective spool of valve 330 or 332 will be spring returned to its neutral position and the pilot operators of valves 370 and 386 will be vented to return the spools of valves 370 and 386 to their neutral positions. Consequently, the respective clutch air boots will be vented to cause the clutch to disengage, the governor positioner will cause the engine throttle to return to idle, and the brake air boot will fill to apply the brake, simultaneously.

When the control lever of the master control is shifted under "crash reversal" conditions, for example from the forward mode into the reverse mode the following results. The ports of the clutch actuator will be vented to cause the clutch to return to neutral and held there for the duration of a neutral delay period, the port on the governor positioner will be vented to cause the engine throttle to return to idle for the duration of the neutral delay period, and the brake air boot will be filled to cause brake application to the output shaft for the duration of the neutral delay period, the duration of the neutral delay period being sufficient to permit the brake to halt rotation of the output shaft. At the end of the neutral delay period, pressure will be applied to the "astern" clutch air boot and cause the clutch to be engaged in its reverse mode, the brake air boot will be vented to release the brake, and a speed boost pressure will be applied to the governor positioner to prevent engine stall as the load is engaged by the engine. At the end of the speed boost, the pressure to the governor positioner will increase to "full speed" in a timed manner thereby controllably raising the engine speed to full speed conditions.

These results are effected by the following occurrences in the control mechanism. The high pressure operator of valve 330 is vented to the "ahead" outlet port of the master control, and full control air supply pressure is applied to the high pressure operator of valve 332. The spool of valve 330 is spring returned to its neutral position thereby venting its outlet port. The spool of valve 332, however, remains in its neutral position despite the application of full control air supply pressure to its high pressure operator because the needle valve restriction in timing valve 336 prevents the immediate exhaust of the full control air supply pressure from its low pressure operator through the vented valve 330. (The respective high and low pressure operators of valve 332 are so designed that any pressure level above a predetermined level, eg 10 psi, will counteract the effect of full control air supply pressure on its high pressure operator and therefore the outlet port of valve 332 will remain vented until the pressure level on the low pressure operator falls below a predetermined level.) Therefore, the condition at both valves 330 and 332 is that their respective outlet ports are vented and the remainder of the circuit downstream of these valves functions as though the control lever of the master control has been shifted to the neutral detent position.

As soon as the spool of valve 330 has shifted to its neutral position, the full control air supply pressure at the low pressure operator of valve 332 begins to bleed through the timing valve 336 to vent at valve 330 at a rate dependent upon the adjustment of the needle valve. When the pressure level on the low pressure operator of valve 332 reaches the aforementioned predetermined level, the spool of valve 332 will shift to interconnect its inlet and outlet ports. The period between the shift of the spool of the valve 330 to the eventual shift of the spool of valve 332 is the "reverse" neutral delay period. Since the pressure on the low pressure operator of valve 332 is the full control air supply pressure, the duration of the "reverse" neutral delay period will be fixed and proportioned to the engine speed at the onset of the "crash reversal" condition. By emperical determination of the time required for the shaft brake to halt the shaft from full speed, the needle valve for the timing valve 336 can be adjusted to provide a "reverse" neutral delay period duration sufficient to match the braking time required. At such a setting the neutral delay period duration will be longer than the braking time required at engine speed conditions less than full speed, but this situation is entirely acceptable if the duration is not unduly long.

On shift of the spool of valve 332 at the end of the "reverse" neutral delay period, the circuit downstream of valves 330 and 332 functions as though the control lever of the master control valve had been shifted from neutral to the full speed astern detent position.

When the control lever of the master control is shifted to put into effect a "crash reversal conditon" in the opposite direction, from the reverse mode to the forward mode, the sequence of the occurrances in the control mechanism is as follows. The high pressure operator of valve 332 is vented to the "astern" outlet port of the master control, and full control air supply pressure is applied to the high pressure operator of valve 330. The spool of valve 332 returns to its neutral position thereby venting its outlet port. The spool of valve 330, however, remains in its neutral position despite the application of full control air supply pressure to its high pressure pressure operator because the needle valve restriction in timing valve 338 prevents the immediate exhaust of the full control air supply pressure from its low pressure operator to the vented valve 332. (The respective high and low pressure operators of valve 330 are so designed that any pressure level over a predetermined level eg 10 psi, will counteract the effect of full control air supply pressure on the high pressure operator and therefore the outlet port of valve 330 will remain vented until the pressure level on its low pressure operator falls below the predetermined level.) Therefore, the condition at both valves 330 and 332 is that their respective outlet ports are vented and the remainder of the circuit downstream of these valves functions as though the control lever of the master control had been shifted to the neutral detent position.

As soon as the spool of valve 332 has shifted to its neutral position, the full control air supply pressure on the low pressure operator of valve 330 begins to bleed through the timing valve 338 to vent at valve 332 at a rate dependent on the adjustment of the needle valve. When the pressure level on the low pressure operator of valve 330 reaches the aforementioned predetermined level, the spool of valve 330 will shift to interconnect its inlet and outlet ports. The period between the shift of the spool of valve 332 and the eventual shift of the spool of valve 330 is the "forward" neutral delay period. Since the pressure on the low pressure operator of valve 330 is the full control air supply pressure, the duration of the "forward" neutral delay period will be fixed and proportioned to the engine speed at the onset of the "crash reversal" condition. By emperical determination of the time required for the shaft brake to halt the shaft from full speed, the needle valve of the timing valve 338 can be adjusted to provide a "forward" Neutral delay period duration sufficient to match the braking time required. At such a setting, the neutral delay period duration will be longer than the required braking time at engine speed conditions less than full speed, but such is entirely satisfactory so long as the duration is not unduly long.

Upon shift of the spool of valve 330 at the end of the "forward" neutral delay period, the circuit downstream of valve 330 and 332 functions as though the control lever of the master control had been shifted from neutral to the full speed astern detent position.

In the FIG. 5 control mechanism, slip clutch control means comprising a "forward" slip clutch control valve 408, a slip clutch regulating valve 410, and a slip clutch shuttle valve 412, are added to the FIG. 4 circuit. The "forward" slip clutch control valve 408 comprises a single pilot-operated and spring returned four-way spool valve. The slip clutch regulating valve 410 comprises an adustable pressure reducing valve. The slip clutch shuttle valve 412 comprises an isolation type valve having two input ports and one output port wherein the two inputs are isolated with the lower pressure input port blocked and the higher pressure input port open to the output port.

The "ahead" output port of the master control is in fluid communication with the right hand inlet port of the slip clutch control valve 408 through line 326, and with the left hand inlet port of valve 408 through line 415 and reducing valve 410. The low pressure operator of valve 408 is in fluid communication with the "speed" outlet port of the master contact through lines 413 and 322, the left hand outlet port of valve 408 is in fluid communication with the right hand inlet port of shuttle valve 412, and the right hand outlet port of valve 408 is in fluid communication with the high pressure operator of the "ahead" clutch control valve 330. The left hand inlet port of shuttle valve 412 is in fluid communication with the outlet port of valve 330 through line 409 connected into line 367 downstream of the "ahead" clutch engagement control and timing valves 335 and 337, and the outlet port of shuttle valve 412 is in fluid communication with the "ahead" clutch air boot through line 366.

In this embodiment the "ahead" clutch air boot is designed such that it may be partially inflated, and therefore to slip, if the engine RPM is held to idle. The master control lever therefore can be shifted to the "ahead" detent position to enable application of full control air supply pressure to the right hand inlet port of valve 408, reduced control air supply pressure through valve 410 to the left hand inlet port of valve 408, and "idle speed" pressure to the low pressure operator of valve 408. The "idle speed" pressure is not sufficient to shift the spool of valve 408 and therefore its right hand inlet is blocked, its left hand inlet is connected to its left hand outlet to pass the reduced control air supply pressure from valve 410 through shuttle valve 412 to the "ahead" clutch air boot to partially inflate the latter, and the right hand outlet port of valve 408 is vented thereby venting the operator of valve 330 so that the spool of valve 330 remains in its neutral position.

As the master control lever is shifted toward the "full speed ahead" detent position, the "speed" pressure will increase to a predetermined level, eg 5 psi, at such level the low pressure operator of valve 408 will cause the spool of valve 408 to shift thereby clocking its left hand inlet port, venting its left hand outlet port, and connecting its right hand inlet port to its right hand outlet port. Full control air supply pressure from the "ahead" port of the master control is thus applied to the high pressure operator of "ahead" clutch control valve 330 to shift the spool valve 330. The control mechanism henceforth functions in the manner described above in regard to FIG. 4.

The provision of the slip clutch feature of FIG. 5 is especially useful in tug operations to permit a tug to take upon lines slowly or to keep a tug in contact with a ship being docked without exerting appreciable force.

Another general feature of the invention employs a master control unit, a replaceable drive unit operable to provide functional operations, such as: speed or governor control, directional mode or clutch control, and/or shaft brake control. If desired, a speed boost signal may also be employed. In the embodiment shown in FIGS. 6, 8 and 10 the master control and replaceable fluid control unit are adapted for mechanical interconnection whereas in the embodiments shown in FIGS. 7, 9 and 11 the master control mechanism and the replaceable fluid control unit are adapted for pneumatic interconnection. Electrical interconnection may also be employed.

In the embodiment shown in FIGS. 6, 8 and 10, master control 610, of a form conventionally used in the marine propulsion field, is connected by a chain and sprocket drive 612 to a sprocket 614 mounted on a replaceable fluid control unit 616. The control unit 616 is connected to a supply line 620 which passes through components of an air treatment panel W and thence through a supply line 623 and a speed boost line 624. A supply line 621 also interconnects the air treatment panel W with a clutch actuator valve U which is pilot operated by air received from the control unit through lines 627 and 628. A supply line 621a also provides 125 psi pressure to brake actuator valve Y which operates a conventional shaft brake.

The air treatment panel W contains a conventional filter 680, a regulator 681 which maintains main supply pressure and brake supply pressure at approximately 125 psi, and a speed boost regulator 682 adjustable from 0 to 30 psi for passing a low speed, short duration signal to the governor, in a manner to be described.

As best shown in FIG. 6 the circuit and components of the control unit 616 include a container or volume A whose rate of filling determines the duration of the speed interrupt or speed boost signal (where employed); a container or volume B the exhaust rate of which determines the neutral delay time from the forward directional mode to reverse directional mode; and a container or volume C which has an exhaust rate that determines the delay time from the forward directional mode to the reverse directional mode. Each of these containers is provided with two ports one of which is controlled by a conventional, combined check valve and flow restricting orifice with the free flow direction indicated by the arrows adjacent the valves. That is, container A is provided with a flow control valve V having a free flow in the direction away from the container; container B has a flow control valve K having a free flow condition in a direction toward the container; and container C has a flow control valve having a free flow condition toward the container. Directional or clutch control valves R and O are cam operated, three-way valves which in the uncammed position block fluid into the inlet port and exhaust fluid through the outlet port. In the cammed or depressed position their inlet and outlet ports are interconnected. Actuation of the valves R and O is controlled by a shaft 614a keyed to the sprocket 614. Cams 615 and 617 aligned respectively with the cam followers of the valves R and O are also keyed to the shaft 614a. Positioning of the master control 610 in the forward position depresses the cam follower for the valve R whereas positioning of the handle into the reverse position releases the cam follower from the valve R and depresses the cam follower for the valve O. Typical valves suitable for this purpose are manufactured by Mathers Controls, Inc. of Seattle, Washington under the designation AD6–1142 Pilot Air Valve Roller Operated. A speed control cam 619 is also secured to the shaft 614a and is aligned with a cam follower on a speed control valve Q. This speed control valve is operable to provide a variable pressure between 0–70 psi with the inlet and outlet ports interconnected during the period when the cam follower is depressed. The inlet is blocked and the outlet vented when the cam follower is released. A typical valve for this purpose is manufactured by the Industrial Products Division of Westinghouse Airbrake Company of Lexington, Kentucky under the designation H–3 Controlair Valve. Speed interrupt valve J is a three-way, double air pilot and spring return valve with the solid lines in FIG. 6 indicating the connection with no pilot pressure. Main supply valve M is a three-way, supply center, double air pilot spring center valve with the solid lines indicating the valve connection with no pilot pressure.

The circuit of FIG. 6 operates as follows: In the neutral mode, the master control 610 is placed in the neutral position releasing all of the cam followers on the valves R, Q, and O. Supply air is admitted at line 620 and passes through a vented cock 683, through the filter 680 and regulator 681, and on to supply line 621 and brake supply line 621a. Air is also supplied through regulator 682 to speed boost line 624. Line 621 supplies clutch air to the four-way, spring-centered, exhaust-center, double air pilot operated clutch actuator valve U through a conventional flow control valve X having restricted passage in one direction and free flow passage in the opposite direction as indicated by the arrow. Air also passes through a container T which holds a predetermined amount of air to provide initial quick clutch filling. It should be understood, that various types of clutches, such as the pneumatically controlled type shown in FIG. 6 or mechanical clutches or the like, may be used and that the exact configuration of the clutch controls will depend on the type of clutch employed. In this neutral position the supply air line 621 is blocked at the valve U with the forward and reverse clutch units vented through the valve U. Supply air also passes through line 623 to a port in the drive unit 616 which communicates with the inlet of the main supply valve M. Valve M being spring centered and supply center, therefore, passes air through a line 625 to the "in" port of valve R and through a line 626 to the "in" port of valve O. Since the cam followers in valves O and R are not depressed the air flow or signal is blocked at the inlet ports of these valves. Lines 627 and 628 connected respectively to the outlet ports of valves R and O, are vented through these respective valves. Since lines 627 and 628 are vented the clutch actuator valve U is in its center position as shown in FIG. 1 and the forward and reverse clutches are vented.

In the forward directional mode, the master control 610 is moved to the forward position which causes cam 615 to depress the cam follower on valve R. The inlet and outlet of valve R are thus connected passing supply air from line 625 to line 627. Air to line 627 will accomplish the following simultaneously: air will pass to the right hand side of the clutch actuator valve U and admit air from container T and line 621 to the forward clutch. Container T is sized to quickly raise the clutch pressure to approximately 15 psi and then the clutch is slowly filled through the flow control valve X to 125 psi. Fill time is approximately 3 seconds. Air also passes through a shuttle valve D to the brake actuator valve Y which moves the valve against the spring bias into the vent position, thus releasing the brake. Supply air from line 627 also passes through a shuttle valve N to a line 629 which is connected to the right hand pilot of the valve J; through a line 629a, through the flow control valve V and the container A to the left hand side of the valve J. Supply air in the line 629 also passes to the "in" port of the speed valve Q. Depending upon the speed signal transmitted from the master control 610 the valve Q will deliver to line 630 at its outlet port a pressure anywhere from 0 to 70 psi. The strength of this signal is, of course, what determines the speed of the engine or power supply. Air passing to the right hand pilot of valve J will immediately shift the valve to the dotted line position initiating a speed interrupt period. If the regulator 682 for the speed boost line 624 is in operation a speed boost signal will be transmitted to the governor at this time. Valve J will remain in the dash line connection until the air pressure on its left hand pilot acting through the flow control valve V and container A steadily climbs to approximately 90 psi. At this time the valve J will then return to its solid line connection. The length of the speed interrupt delay depends upon the restrictor orifice in the flow control valve V. Valve J will serve as a speed interrupt until the clutch pressure has climbed to approximately 80 psi. Air is also supplied from line 627 through flow control valve K in the free-flow direction filling container B and the left hand pilot of the main supply valve M. Pressure on the left hand pilot of the main supply valve M will continue to permit supply air to pass from line 623 to line 625 but will block the connection between line 623 and line 626.

For a full speed forward position, the master control is placed in the full forward position which causes cam 619 to fully depress the cam follower of speed control valve Q which will deliver air at about 70 psi to line 630. This signal will pass through valve J to line 631 and thence to the pneumatic governor positioner. It should be understood that the term governor is intended merely to designate a speed control and may be of any suitable type.

In a crash or otherwise quick reversal situation, that is, where the master control 610 is shifted from full forward to full reverse the following will occur: cam 615 will disengage from valve R thus venting line 627 through valve R and blocking the signal in line 625 at the inlet of valve R. Cam 617 will depress the cam follower on valve O thus connecting line 626 to line 628 through valve 0. Cam 619 will again depress the cam follower on valve Q calling for a full speed signal. Since line 627 is vented through valve R, clutch actuator valve U will spring return to its center position and the previously filled forward clutch is vented. Line 627 being vented also vents line 629 and, therefore, vents line 630 through valve Q. The speed signal through line 631 to the governor positioner is thus also vented through valve J and line 630. Line 626 is connected to line 628 through valve O but there is no pressure in line 626 because the connection from line 623 to line 626 is blocked by valve M. Valve M is held in this position by air pressure on the left hand pilot which must first bleed from container B through flow control valve K into the vented line 627. This bleeding time causes a neutral delay which is dependent upon the time required for the air pressure on the left hand pilot of valve M to bleed from 125 psi to approximately 30 psi. The timing of this delay is determined by the size of container B and the orifice in the flow control valve K. Once the pressure on the left hand pilot of valve M drops below 30 psi, valve M will be spring centered and supply air will pass from line 623 to line 626. Air passing from line 626 through valve 0 to line 628 supplies air to shift valve U toward the right to energize the reverse clutch; supplies air to valve Q through shuttle valve N for a speed signal; shifts valve J via line 629 to the speed interrupt or speed boost positions shown in dotted lines; and supplies the right hand pilot of valve M through the free flowing position of the flow control valve L and the container C.

The basic sequences that the engine or power source and the clutches see during a crash reversal is as follows: The governor goes to idle. The forward and reverse clutches are vented. The system will remain in this condition for approximately one second in order to guarantee the forward clutch venting and to allow the engine rpm to start down. This neutral delay timing is established by the container B. If a shaft brake is used, the neutral delay timing would be spread out to 2 or 3 seconds in order to allow the shaft brake to stop the propeller shaft. Clutch pressure rises quickly from 0 to approximately 15 psi supplied by the container T and then slowly the rest of the way to 125 psi. The time requirement is approximately 3 seconds. A speed signal is allowed to start up when the clutch pressure reaches approximately 90 psi the speed interrupt period being determined by the volume of container A. If a shaft brake is used, the clutch is allowed to fill more quickly as the clutch has less work to do. Speed boost is available during the speed interrupt period if required. The neutral delay when going from reverse to forward is set by the volume of container C and the flow control valve L.

Several advantages are apparent from this use of containers, such as A, B and C having any desired volumeric capacity. The length of any one of the delays either forward to reverse or reverse to forward or the speed interrupt may be varied independently of the other delays merely by changing the size of the orifices in the flow control valve V, K or L. These delays can be calculated in advance and a supply of different size orifices may be kept on hand if delay time changes are desired. Another advantage is that the delay times are always consistent each time they are initiated. Conventional quick release valves I in the lines 627, 628 and 631 guarantee this uniform timing.

Another advantage of the invention is that all of the intricate controls and valving may be prepackaged or premanufactured and installed in a control system as a unit. Thus if a component within the control unit 616 should become clogged or otherwise malfunction, a replacement unit may be quickly installed by workmen readily available aboard the vessel. With a prepackaged control unit, a base 650 which supports the various components is sealed by a housing 652 to make the unit air-tight, tamper-proof and virtually free of debris or corrosion likely to be present in a marine environment. The control unit as best shown in FIG. 10, has its base machined with bores that communicate with the various valve mechanisms forming the circuit shown in FIG. 6 so that piping and fittings and the like are eliminated. This, of course, also reduces substantially the amount of space required to house the control unit 616. The unit 760 of FIGS. 7, 9 and 11 similarly employs these features.

Figure 7:
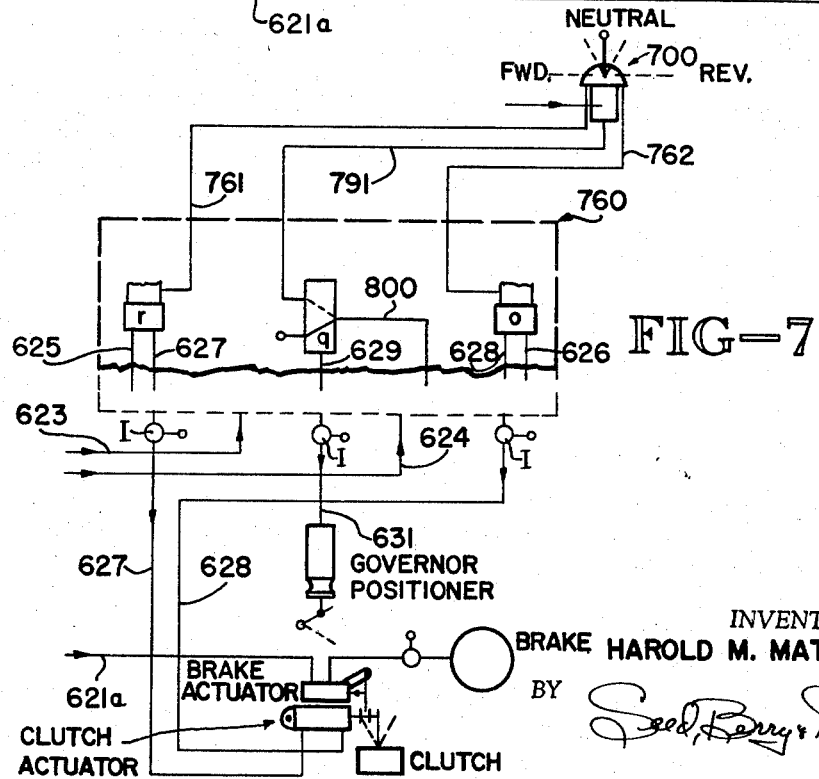
FIG. 7 is an illustration of a control system similar to the system of FIG. 1 but showing a pneumatic connection between a master control and the control unit.

In the embodiment shown in FIGS. 7, 9 and 11, the components are basically identical to that of the embodiment shown in FIGS. 6, 8 and 10 with exceptions which will now be mentioned. A master control 700 is pneumatically contacted to a control unit 760 and supplies an air signal to forward and reverse directional or clutch control valves r and o respectively, and to a speed control valve q. Valves r and o are similar to valves R and O of the earlier embodiment, also being manufactured by Mathers Control, Inc. of Seattle, Washington under the designation AD6–1942 Pilot Air Valve Pilot Operated. Rather than being cam or mechanically operated, however, these valves are pneumatically operated; otherwise the functioning of valves r, o and R, O is identical. Speed control valve q differs from speed control valve Q in that valve q (as shown in FIG. 7) is a three-way spring-biased vented valve with a pilot operator connected to line 790. A signal passing through a pneumatic line 791, the pressure of which is determined by the setting of the master control 700, is blocked at the valve q whenever line 790 is vented. From the earlier description, it will be recalled that this occurs only during the neutral setting of the master control 700 or during the neutral delay period going from forward to reverse or reverse to forward. Lines 761 and 762 pneumatically interconnect the forward and reverse positions of the master control with the forward and reverse directional valves r and o. The brake actuator valve is mechanically coupled to the clutch actuator valve such that it follows the position of the clutch actuator valve. Thus, when the clutch is engaged in either the forward or reverse directional mode, the brake actuator valve will be positioned to release the brake but when the clutch actuator is going through a neutral delay the brake actuator will energize the brake. Conventional shuttle valves 755 are employed to permit the master control 700 to be used at different locations aboard the vessel. The master controls may be switched from one to the other by use of transfer buttons 765, the details of which are not essential to an understanding of this invention.

While the preferred form of this invention has been illustrated and described, it should be understood that other variations will be apparent to one skilled in the art. Accordingly, it is my intention that no limitations be implied and that the hereto annexed claims be given the broadest interpretation to which the employed language fairly admits.

The embodiments of the invention in which an exclusive property or privilege is claimed are defined as follows:

1. In a propulsion system provided with a power source and a speed control operable to control the output of said power source, means for connecting the power source output to a load, means for controlling the direction of rotation of said load connecting means, and master control means including actuator means positionable in forward or reverse modes and when in said forward mode producing a pneumatic forward direction control signal to said load connecting direction control means and a pneumatic speed signal to said speed control and when in said reverse mode producing a pneumatic reverse direction control signal to said load connecting direction control means and a pneumatic speed signal to said speed control, and means responsive to a pneumatic directional control signal in the opposite directional mode for respectively delaying passage of said pneumatic signal in the opposite directional mode to said load connecting direction control means for a neutral delay period and to delay said pneumatic speed signal, said delaying means including delay valve means for precluding passage of said pneumatic directional control signal in the opposite mode, a flow restriction, and a container of constant volume holding a quantity of air, and wherein the pneumatic directional control signal in the opposite directional mode initiates release of said air from said container through said flow restriction until the pressure in said container drops to a predetermined level to allow opening said delay valve means to pass the pneumatic directional control signal to actuate the load connecting direction control means in the opposite directional mode and wherein the length of delay can be accurately determined by the size of the flow restriction and volume of the container.

2. The system of claim 1 wherein said means for delaying passage of said signal includes a pilot-operated main supply valve which intercepts supply pressure from a main supply line to a directional valve.

3. The system of claim 1 said flow restriction and container being for astern operation and further including a flow restriction and container for ahead operation and a flow restriction and container for speed operation and wherein the flow restrictions and container volumes can be adjusted independently to adjust the length of the delays.

4. The system of claim 1 said means for delaying passage of said signal includes ahead and astern clutch control valves each of which intercept supply pressure from a main supply line to a respective ahead and astern load connecting means.

5. A control system for marine propulsion or the like application, having a positioner for controlling the power source output, means for connecting the power source and a load in either a forward or reverse directional mode, the improvement comprising:

a master control operable to transmit forward, neutral or reverse directional signals and a speed signal; and a replaceable integral fluid control unit including a plurality of valves operatively connected with said master control and said positioner and with said power source and load connecting means, said control unit including a housing having a base and enclosing said valves, said base including a plurality of passages integrally formed therein and operatively interconnecting said valves to control the flow of fluid to said positioner and to said means connecting said power source and load in response to signals received from said master control, and to automatically provide a neutral delay period between operation of said connecting means in one directional mode and in the opposite directional mode, said valves and fluid passages of said replaceable integral fluid control unit being pre-calibrated and tuned such that substitution of one integral unit for another in the field effects a duplication of the fluidic operating functions of the control system without the need for individual tuning of any individual valve forming part of the unit.

6. The control system of claim 5 wherein said valves include a forward to reverse delay container and a reverse to forward delay container, the containers each having an inlet port closed by a check valve and flow restricting orifice and an outlet port.

7. The control system of claim 5 wherein said valves include forward and reverse directional control valves.

8. The control system of claim 5 wherein said master control and said forward and reverse directional control valves are connected by mechanical linkages.

9. The control system of claim 5 wherein said master control and said forward and reverse directional control valves are connected by pneumatic lines.

10. The control system of claim 5 wherein said valves also include a speed-interrupt container having an inlet port closed by a check valve and a flow restricting orifice and an outlet port.

11. The control system of claim 5 wherein said valves include forward and reverse directional control valves and a speed control valve; forward to reverse and reverse to forward delay containers each including a port closed by a check valve free flowing in one direction and a flow restriction orifice restricting flow in the opposite direction; a speed interrupt container also including a port having a check valve free flowing in one direction and an orifice restricting flow in the opposite direction; and a pilot-operated main supply valve pilot connected at its opposite ends to the forward to reverse and reverse to forward delay containers, respectively.

12. A control mechanism defined by claim 10 further including means for transmitting a speed boost signal at the termination of said neutral delay period to provide a speed boost signal to said positioner for a predetermined duration to be replaced at the end of said duration by the speed control signal from said master control.

* * * * *